United States Patent
Park et al.

(10) Patent No.: US 11,902,995 B2
(45) Date of Patent: *Feb. 13, 2024

(54) METHOD AND DEVICE FOR PRIORITY-BASED CONTROL AND DATA INFORMATION TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Hyunseok Ryu, Suwon-si (KR); Jonghyun Bang, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,443

(22) Filed: Jul. 1, 2022

(65) Prior Publication Data
US 2022/0346071 A1 Oct. 27, 2022

Related U.S. Application Data

(63) Continuation of application No. 16/819,863, filed on Mar. 16, 2020, now Pat. No. 11,382,087.

(30) Foreign Application Priority Data

Mar. 15, 2019 (KR) .................... 10-2019-0029615

(51) Int. Cl.
*H04W 72/23* (2023.01)
*H04W 72/56* (2023.01)

(52) U.S. Cl.
CPC .......... *H04W 72/23* (2023.01); *H04W 72/56* (2023.01)

(58) Field of Classification Search
CPC . H04W 72/042; H04W 72/10; H04W 72/048; H04W 72/1289; H04W 72/1242;
(Continued)

(56) References Cited

U.S. PATENT DOCUMENTS

| 2018/0035459 A1 | 2/2018 | Islam et al. |
| 2020/0146028 A1* | 5/2020 | Yang .................. H04W 72/0413 |
| 2020/0267753 A1* | 8/2020 | Adjakple .......... H04W 72/1226 |

FOREIGN PATENT DOCUMENTS

| KR | 10-2019-0001622 A | 1/2009 |
| WO | 2018/232284 A1 | 12/2018 |

(Continued)

OTHER PUBLICATIONS

ETRI, Views on intra-UE DL prioritization for URLLC, 3GPP TSG RAN WG1 Meeting #96, Athens, Greece, Feb. 25-Mar. 1, 2019, R1-1902442. (Year: 2019).*

(Continued)

*Primary Examiner* — Shailendra Kumar
(74) *Attorney, Agent, or Firm* — Jefferson IP Law, LLP

(57) ABSTRACT

A communication technique for convergence of a 5G communication system for supporting a higher data transmission rate beyond a 4G system with an IoT technology, and a system therefor. The disclosure may be applied to intelligent services based on a 5G communication technology and an IoT-related technology. A method of a terminal of a wireless communication system is provided. The method includes receiving, from a base station, downlink control information (DCI) for scheduling of data transmission/reception, checking priority information related to the DCI, based on the priority information, determining whether to perform data
(Continued)

transmission/reception scheduled according to the DCI, and if the data transmission/reception is determined to be performed, performing the data transmission/reception, wherein the priority information is indicated by a priority information field in the DCI, is a value configured by higher layer signaling, or is related to a format of the DCI.

20 Claims, 13 Drawing Sheets

(58) Field of Classification Search
CPC ...... H04W 8/24; H04L 1/1854; H04L 1/1896; H04L 1/1887
See application file for complete search history.

(56) References Cited

FOREIGN PATENT DOCUMENTS

| WO | WO-2018232284 A1 * | 12/2018 | .......... H04W 72/042 |
|----|--------------------|---------|-----------------------|
| WO | 2019/032843 A1     | 2/2019  |                       |

OTHER PUBLICATIONS

Convida Wireless, On Intra-UE prioritization, 3GPP TSG RAN WG1 Meeting #96, Athens, Greece, Feb. 25-Mar. 1, 2019, R1-1903157. (Year: 2019).*

Ericsson, Physical Layer Enhancements for Intra-UE Prioritization and Multiplexing, 3GPP TSG RAN WG1 Meeting #96, Athens, Greece, Feb. 25-Mar. 1, 2019, R1-1901601. (Year: 2019).*

Nokia, Nokia Shanghai Bell, On intra-UE DL/UL prioritization for NR URLLC, 3GPP TSG RAN WG1 Meeting #96, Athens, Greece, Feb. 25-Mar. 1, 2019, R1-1901917. (Year: 2019).*

International Search Report dated Jun. 29, 2020, issued in an International Application No. PCT/KR2020/003591.

ETRI, 'Views on intra-UE DL prioritization for URLLC', R1-1902442, 3GPP TSG RAN WG1 Meeting #96, Feb. 16, 2019, Athens, Greece.

Convida Wireless, 'On Intra-UE prioritization', R1-1903157, 3GPP TSG RAN WG1 Meeting #96, Feb. 16, 2019, Athens, Greece.

Ericsson, 'Physical Layer Enhancements for Intra-UE Prioritization and Multiplexing', R1-1901601, 3GPP TSG RAN WG1 Meeting #96, Feb. 16, 2019, Athens, Greece.

Nokia et al., 'On intra-UE DL/UL prioritization for NR URLLC', R1-1901917, 3GPP TSG RAN WG1 Meeting #96, Feb. 15, 2019, Athens, Greece.

Asustek, Intra UE prioritization for UL grants, R2-1901039, 3GPP TSG-RAN WG2 Meeting #105, Athens, Greece, Feb. 14, 2019.

Nokia, Nokia Shanghai Bel, Summary of contributions on UL/DL intra-UE prioritization /multiplexing, R1-1903369, 3GPP TSG-RAN WG2 #96, Athens, Greece, Feb. 26, 2019.

Vivo, UL inter-UE Tx prioritization for URLLC, R1-1901696, 3GPP TSG-RAN WG2 #96, Athens, Greece, Feb. 16, 2019.

Extended European Search Report dated Mar. 24, 2022, issued in European Patent Application No. 20772585.4.

Nokia et al., Summary of contributions on UL/DL intra-UE prioritization/multiplexing, R1-1903369, 3GPP TSG-RAN WG1 #96, Athens, Greece, Feb. 26, 2019.

Indian Office Action dated Aug. 24, 2023, issued in Indian Patent Application No. 202137039971.

* cited by examiner

METHOD AND DEVICE FOR PRIORITY-BASED CONTROL AND DATA INFORMATION TRANSMISSION IN WIRELESS COMMUNICATION SYSTEM

CROSS-REFERENCE TO RELATED APPLICATION(S)

This application is a continuation application of prior application Ser. No. 16/819,863, filed on Mar. 16, 2020, which is based on and claims priority under 35 U.S.C. § 119(a) of a Korean Patent Application number 10-2019-0029615, filed on Mar. 15, 2019, in the Korean Intellectual Property Office, the disclosure of which is incorporated by reference herein in its entirety.

BACKGROUND

1. Field

The disclosure relates to a wireless communication system. More particularly, the disclosure relates to a method for priority-based control and data information transmission.

2. Description of Related Art

To meet the demand for wireless data traffic having increased since the deployment of 4th generation (4G) communication systems, efforts have been made to develop an improved 5th generation (5G) or pre-5G communication system. Therefore, the 5G or pre-5G communication system is also called a "Beyond 4G Network" or a "Post long term evolution (LTE) System". The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in the 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The 5G communication system is evolving to provide various services, and accordingly schemes for efficiently providing these services are needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for efficiently providing various services. Particularly, the disclosure is to provide a method and device for, if a priority exists between each service, transmitting or receiving data and control information according to the priority.

Additional aspects will be set forth in part in the description which follows and, in part, will be apparent from the description, or may be learned by practice of the presented embodiments.

In accordance with an aspect of the disclosure, a method of a terminal of a wireless communication system is provided. The method includes receiving, from a base station, downlink control information (DCI) for scheduling of data transmission/reception, checking priority information related to the DCI, based on the priority information, determining whether to perform data transmission/reception scheduled according to the DCI, and if the data transmission/reception is determined to be performed, performing the data transmission/reception, wherein the priority information is indicated by a priority information field in the DCI, is a value configured by higher layer signaling, or is related to a format of the DCI.

The method further includes transmitting, to the base station, at least one piece of terminal capability information (user equipment (UE) capability information) related to a service that can be performed by the terminal, wherein the priority information is configured based on the UE capability information. The priority information is included in the DCI if the format of the DCI is a non-fallback DCI format, and is indicated by the high layer signaling if the format of the DCI is a fallback DCI format.

The method further includes receiving preemption indication information from the base station, wherein whether to perform the data transmission/reception is determined based on the preemption indication and a priority related to the DCI. The method further includes receiving information of configured scheduling from the base station, wherein whether to perform the data transmission/reception is determined based on the configured scheduling and a priority related to the DCI.

In accordance with another aspect of the disclosure, a method of a base station of a wireless communication system is provided. The method includes checking priority information related to downlink control information (DCI), transmitting, to a terminal, the downlink control information (DCI) for scheduling of data transmission/reception, determining whether data transmission/reception scheduled according to the DCI is to be performed, based on the priority information, and if the data transmission/reception is determined to be performed, performing the data transmission/reception with the terminal, wherein the priority information is indicated by a priority information field in the DCI, is a value configured by higher layer signaling, or is related to a format of the DCI.

In accordance with another aspect of the disclosure, a terminal of a wireless communication system is provided. The terminal includes a transceiver, and at least one processor configured to perform control to receive, from a base station, downlink control information (DCI) for scheduling of data transmission/reception, check priority information related to the DCI, determine whether data transmission/reception scheduled according to the DCI is to be performed, based on the priority information, and if the data transmission/reception is determined to be performed, perform the data transmission/reception, wherein the priority information is indicated by a priority information field in the DCI, is a value configured by higher layer signaling, or is related to a format of the DCI.

In accordance with another aspect of the disclosure, a base station of a wireless communication system is provided. The base station includes a transceiver, and at least one processor configured to perform control to check priority information related to downlink control information, transmit, to a terminal, the downlink control information (DCI) for scheduling of data transmission/reception, determine whether data transmission/reception scheduled according to the DCI is to be performed, based on the priority information, and if the data transmission/reception is determined to be performed, perform the data transmission/reception with the terminal, wherein the priority information is indicated by a priority information field in the DCI, is a value configured by higher layer signaling, or is related to a format of the DCI.

According to disclosed embodiments of the disclosure, a radio resource can be efficiently used, and various devices can be efficiently provided to a user according to priority.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
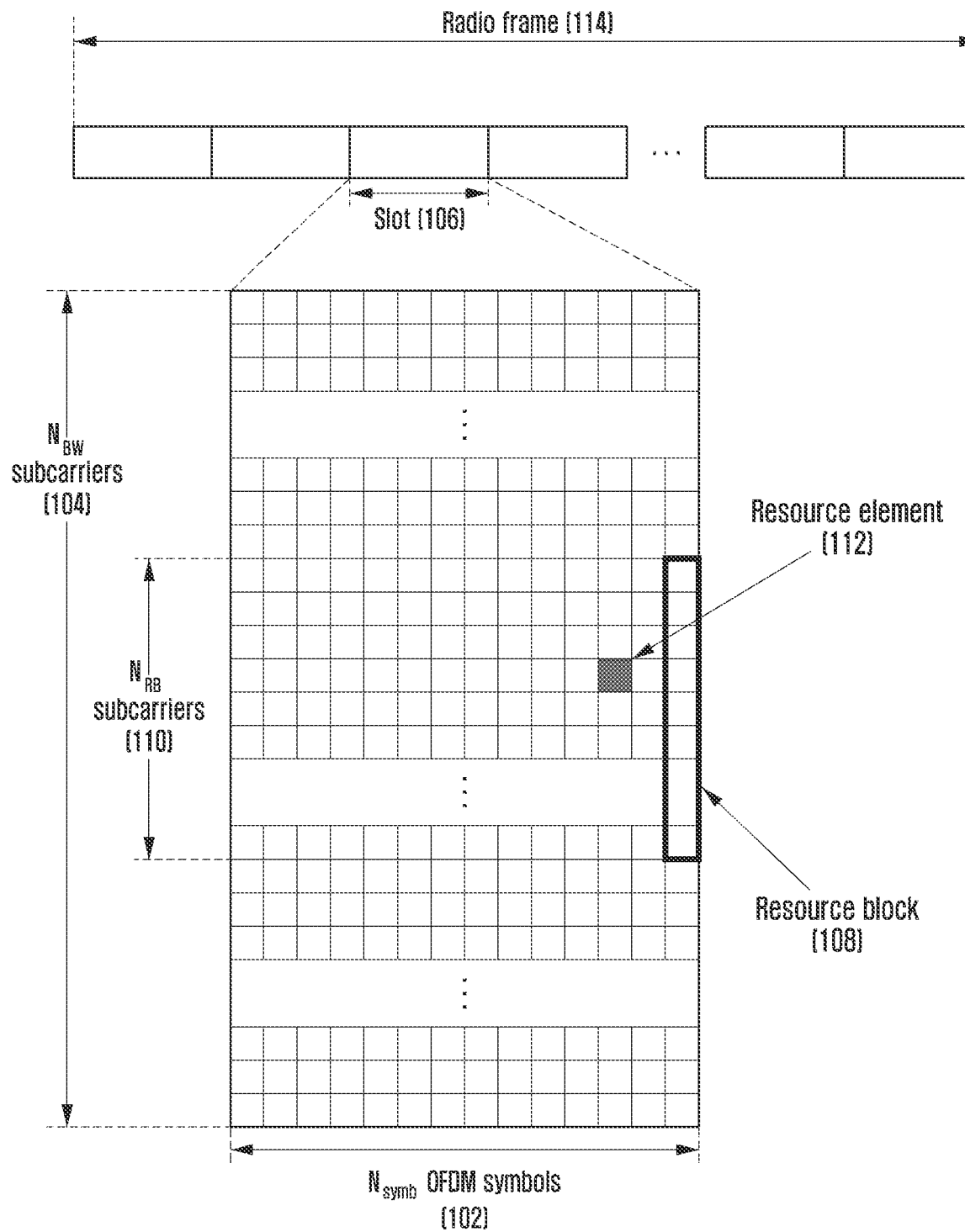
FIG. 1 is a diagram illustrating a transmission structure in a time-frequency domain, that is, a radio resource region of a 5G or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the given order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has moved away from providing early voice-oriented services, and advances in broadband wireless communication systems that provide high-speed and high-quality packet data services, such as communication standards, for example, 3GPP's high speed packet access (HSPA), long term evolution (LTE) or evolved universal terrestrial radio access (E-UTRA), LTE-advanced (LTE-A), 3GPP2's high rate packet data (HRPD), ultra-mobile broadband (UMB), IEEE's 802.16e, and the like. Further, communication standards for 5G or new radio (NR) are generated based on 5th generation wireless communication system.

In the 5G or NR system, which is a typical example of a broadband wireless communication system, an orthogonal frequency division multiplexing (OFDM) scheme is adopted in downlink (DL) and uplink (UL). More specifically, a cyclic-prefix OFDM (CP-OFDM) scheme is adopted in downlink, and a discrete Fourier transform spreading OFDM (DFT-S-OFDM) scheme is adopted in addition to the CP-OFDM in uplink. Uplink refers to a radio link through which a terminal transmits data or a control signal to a base station, and downlink refers to a radio link through which a base station transmits data or a control signal to a terminal. In such a multiple access scheme, in general, data or control information of each user may be distinguished by assigning and operating time-frequency resources, at which data or control information of each user is transmitted, so as not to overlap each other, that is, to establish orthogonality.

The 5G or NR system adopts a hybrid automatic repeat request (HARQ) scheme in which corresponding data is retransmitted in a physical layer when a decoding failure occurs in initial transmission. In the HARQ scheme, when a receiver fails to correctly decode the data, the receiver transmits negative acknowledgement (NACK) informing a transmitter of the decoding failure so as to enable the transmitter to retransmit the data in a physical layer. The receiver improves data reception performance, by combining the data retransmitted by the transmitter with the data, decoding of which has previously failed. Further, when the receiver correctly decodes the data, the receiver may transmit information (Acknowledgment (ACK)) indicating a success of decoding to the transmitter so as to allow the transmitter to transmit new data.

The new radio (NR) access technology system, i.e., new 5G communication, is designed so that various services are freely multiplexed in time and frequency resources, and accordingly, a waveform, numerology, a reference signal, or the like, may be assigned dynamically or freely according to the needs of corresponding services. In the 5G or NR system, types of supported services may be divided into categories, such as enhanced mobile broadband (eMBB), massive machine type communications (MMTC), and ultra-reliable and low-latency communications (URLLC). The eMBB is a service aimed at high speed transmission of high capacity data, the mMTC is a service aimed at minimizing a terminal power and accessing multiple terminals, and the URLLC is a service aimed at high reliability and low latency. Different requirements may be applied depending on types of services applied to the terminal.

In the disclosure, terms are defined based on respective functions, and may vary depending on intention or usage of users or operators. Therefore, the definition should be based on the contents throughout the specification. Hereinafter, a base station is a subject that performs resource assignment to a terminal, and may be at least one of a gNode B (gNB), an eNode B (eNB), a Node B, a base station (BS), a radio access unit, a base station controller, or a node on a network. A terminal may include a user equipment (UE), a mobile station (MS), a cellular phone, a smart phone, a computer, or a multimedia system capable of performing a communication function. Hereinafter, in the disclosure, the NR system is described as an example, but the disclosure is not limited thereto. Embodiments may be applied to various communication systems having similar technical backgrounds or channel forms. Further, the disclosure may be applied to other communication systems via some modifications without departing from the scope of the disclosure, according to determination by those skilled in the art.

In the disclosure, the terms of physical channel and signal may be used interchangeably with data or a control signal. For example, although a physical downlink shared channel (PDSCH) is a physical channel through which data is transmitted, the PDSCH may be referred to as data in the disclosure. For example, PDSCH transmission or reception may be understood as data transmission and reception.

In the disclosure, higher signaling (which may be used interchangeably with a higher signal, a higher layer signal, or higher layer signaling) is a method of transferring a signal from a base station to a terminal through a physical downlink data channel, or a method of transferring a signal from a terminal to a base station through a physical uplink data channel, and may also be referred to as radio resource control (RRC) signaling or medium access control (MAC) control element (CE).

Recently, as researches on the 5G communication system progress, various methods of scheduling communication with a terminal have been discussed. Accordingly, efficient scheduling and data transmission/reception methods based on characteristics of the 5G communication system are required. Accordingly, in order to provide a plurality of services to a user in a communication system, a method capable of providing a user with each service according to characteristics of the service within the same time interval, and a device using the method are required.

A terminal should receive separate control information from a base station in order to transmit data to or receive data from the base station. However, in case of a service type requiring periodic traffic or low latency and/or high reliability, it may be possible to transmit or receive data without separate control information. In the disclosure, such a transmission scheme is referred to as a configured grant (which may be interchangeably used with configured grant, grant-free, or configured scheduling)-based data transmission method. A method of receiving or transmitting data after receiving a data transmission resource configuration, which is configured via control information, and related information may be referred to as a first signal transmission/reception type, and a method of transmitting or receiving data based on previously configured information without control information may be referred to as a second signal transmission/reception type. For the second signal transmission/reception type, preconfigured resource regions are periodically present, and for these regions, there exist an uplink type 1 grant (UL type 1 grant) configured only by a higher signal, and an uplink type 2 grant (UL type 2 grant) (or semi-persistent scheduling (SPS)) which is a method configured by a combination of the higher signal and signal L1 (i.e., downlink control information (DCI)). In the case of the UL type 2 grant (or SPS), a part of information is a higher signal, and whether or not to transmit actual data is determined by signal L1. Here, signal L1 may be broadly classified into a signal indicating activation of a resource, which is configured as a higher level, and a signal indicating release of the activated resource.

FIG. 1 is a diagram illustrating a transmission structure in a time-frequency domain, that is, a radio resource region of a 5G or NR system according to an embodiment of the disclosure.

Referring to FIG. 1, a horizontal axis represents a time domain and a vertical axis represents a frequency domain in a radio resource region. A minimum transmission unit in the time domain is an OFDM symbol, and the $N_{symb}$ number of OFDM symbols 102 are gathered to constitute one slot 106. A length of a subframe may be defined as 1.0 ms and a radio frame 114 may be defined as 10 ms. A minimum transmission unit in the frequency domain is a subcarrier, and a bandwidth of the entire system transmission bandwidth may include a total of the $N^{BW}$ number of subcarriers 104. Such a specific value may be applied variably depending on the system.

A basic unit of a time-frequency resource region is a resource element (RE) 112 and may be represented by an OFDM symbol index and a subcarrier index. A resource block (RB) 108 may be defined as the $N_{RB}$ number of consecutive subcarriers 110 in the frequency domain.

In general, a minimum transmission unit of data is an RB unit. In a 5G or NR system, $N_{symb}=14$, $N_{RB}=12$, and $N_{BW}$ may be proportional to a bandwidth of a system transmission band. A data rate increases in proportion to the number of RBs scheduled to a terminal. In the 5G or NR system, a downlink transmission bandwidth and an uplink transmission bandwidth may be different in the case of an FDD system that operates by dividing a downlink and an uplink by frequency. A channel bandwidth represents an RF bandwidth corresponding to the system transmission bandwidth. Table 1 below shows the correspondence between a channel bandwidth and the system transmission bandwidth defined in an LTE system that is a 4$^{th}$ generation wireless communication, before the 5G or NR system. For example, in an LTE system having a channel bandwidth of 10 MHz, a transmission bandwidth includes 50 RBs.

TABLE 1

| | Channel bandwidth BW$_{Channel}$ [MHz] | | | | | |
| --- | --- | --- | --- | --- | --- | --- |
| | 1.4 | 3 | 5 | 10 | 15 | 20 |
| Transmission bandwidth configuration N$_{RB}$ | 6 | 15 | 25 | 50 | 75 | 100 |

In the 5G or NR system, a channel bandwidth wider than the channel bandwidth of LTE shown in Table 1 may be employed. Table 2 shows a correspondence relationship between a system transmission bandwidth, a channel bandwidth, and a subcarrier spacing (SCS) in the 5G or NR system.

TABLE 2

| SCS | Channel bandwidth BW$_{Channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum Transmission bandwidth N$_{RB}$ | | | | | | | | | | |
| 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

Scheduling information on downlink data or uplink data in the 5G or NR system is transferred from a base station to a terminal based on downlink control information (DCI). DCI is defined according to various formats, and the DCI may represent, according to each format, whether scheduling information is for uplink data (UL grant) or scheduling information is for downlink data (DL grant), whether the DCI is compact DCI having a small size of control information, whether spatial multiplexing using multiple antennas is applied, whether the DCI is for controlling power, and the like. For example, DCI format 1_1, which is scheduling control information (DL grant) for downlink data, may include at least one piece of following control information.

Carrier indicator: Indicating at which frequency carrier transmission is performed DCI format indicator: An indicator that identifies whether corresponding DCI is for downlink or uplink Bandwidth part (BWP) indicator: Indicating in which BWP downlink data is transmitted Frequency domain resource allocation: Indicating an RB of a frequency domain allocated for data transmission. A resource to be represented is determined according to a system bandwidth and a resource allocation scheme.

Time domain resource allocation: Indicating in which OFDM symbol of which slot a data-related channel is to be transmitted VRB-to-PRB mapping: Indicating by which scheme a virtual RB (hereinafter, VRB) index and a physical RB (hereinafter, PRB) index are to be mapped Modulation and coding scheme (MCS): Indicating a coding rate and a modulation scheme used for data transmission. For example, a coding rate value that can inform a transport block size (TBS) and channel coding information, in addition to information indicating whether a modulation scheme is quadrature phase shift keying (QPSK), quadrature amplitude modulation (16QAM), 64QAM, or 256QAM may be indicated.

Codeblock group (CBG) transmission information: When retransmission of a CBG is configured, indicating information relating to which CBG is transmitted HARQ process number: Indicating a process number of HARQ New data indicator: Indicating whether transmission is HARQ initial transmission or retransmission Redundancy version: Indicating a redundancy version of HARQ Physical uplink control channel (PUCCH) resource indicator: Indicating a PUCCH resource for transmission of ACK/NACK information for downlink data PDSCH-to-HARQ_feedback timing indicator: Indicating a slot in which ACK/NACK information for downlink data is transmitted Transmission power control (TPC) command for PUCCH: Indicating a transmission power control command for PUCCH, i.e., an uplink control channel In the case of PUSCH transmission, time domain resource assignment may be transferred according to information relating to a slot at which the PUSCH is transmitted, and a starting OFDM symbol position S at the slot and the number L of OFDM symbols to which the PUSCH is mapped. The above-described S may be a relative position from starting of the slot, L may be the number of consecutive OFDM symbols, and S and L may be determined based on a start and length indicator value (SLIV) defined as follows.

If (L−1)≤7 then
SLIV=14·(L−1)+S
else
SLIV=14·(14−L+1)+(14−1−S)
where 0<L≤14−S

In the 5G or NR system, in general, a table including an SLIV, a PUSCH mapping type, and information on a slot, in which a PUSCH is transmitted, in one row may be configured via an RRC configuration. Subsequently, in time domain resource assignment of DCI, the base station may transfer information on an SLIV, a PUSCH mapping type, and a slot, at which a PUSCH is transmitted, to the terminal by indicating an index value in the configured table. Such a method is also applied to PDSCH.

Specifically, if the base station indicates, to the terminal, time resource allocation field index m included in DCI for scheduling of the PDSCH, the indication informs of a combination of DRMS type A position information, PDSCH mapping type information, slot index K0, data resource start symbol S, and data resource allocation length L, which correspond to m+1 in the table showing time domain resource allocation information. For example, Table 3 below is a table including normal cyclic prefix-based PDSCH time domain resource allocation information.

TABLE 3

| Row index | dmrs-TypeA-Position | PDSCH mapping type | K$_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type A | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dmrs-typeA-Position is a field indicating a symbol position at which a DMRS is transmitted within one slot indicated by a system information block (SIB) that is a piece of terminal common control information. A possible value for the field is 2 or 3. When a total number of symbols constituting one slot is 14 and a first symbol index is 0, 2 refers to a third symbol and 3 refers to a fourth symbol. In Table 3, the PDSCH mapping type is information indicating a position of a DMRS in a scheduled data resource region. If the PDSCH mapping type is A, a DMRS is always transmitted or received at a symbol position determined by dmrs-typeA-Position regardless of the allocated data time domain resource. If the PDSCH mapping type is B, a position of the DMRS for transmission/reception is always a first symbol of the allocated data time domain resource. In other words, PDSCH mapping type B does not use dmrs-typeA-Position information.

In Table 1, $K_0$ refers to an offset of a slot index to which PDCCH, on which DCI is transmitted, belongs and a slot index, to which a PUSCH or PDSCH scheduled in the DCI belongs. For example, if a slot index of the PDCCH is n, a slot index of the PUSCH or PDSCH scheduled by DCI of the PDCCH is n+$K_0$. In Table 3, S refers to a start symbol index of a data time domain resource within one slot. The range of a possible S value is 0 to 13 based on a normal cyclic prefix. In Table 1, L refers to a data time domain resource interval length within one slot. The range of a possible L value is 1 to 14.

In the 5G or NR systems, PUSCH mapping types are defined by type A and type B. In PUSCH mapping type A, a first OFDM symbol of DMRS OFDM symbols is located in a second or third OFDM symbol of the slot. In PUSCH mapping type B, the first OFDM symbol of DMRS OFDM symbols is located in a first OFDM symbol in a time domain resource allocated for PUSCH transmission. The above-described method for PUSCH time domain resource assignment may be equally applicable to PDSCH time domain resource assignment.

DCI may be transmitted on a physical downlink control channel (PDCCH) (or control information, hereinafter, PDCCH and control information may be interchangeably used) which is a downlink physical control channel via channel coding and modulation. In general, DCI is independently scrambled with a specific radio network temporary identifier (RNTI) (or a terminal identifier) for each terminal, has a cyclic redundancy check (CRC) added thereto, is channel-coded, and then is configured to each independent PDCCH so as to be transmitted. The PDCCH is mapped to a control resource set (CORESET) configured in the terminal and then transmitted.

Downlink data may be transmitted on a physical downlink shared channel (PDSCH) that is a physical channel for downlink data transmission. The PDSCH may be transmitted after a control channel transmission interval, and scheduling information, such as a specific mapping position, a modulation scheme, or the like, in the frequency domain, is determined based on DCI transmitted through the PDCCH.

Via modulation coding scheme (MCS) in control information constituting the DCI, a base station notifies a terminal of a modulation scheme applied to the PDSCH for transmission and the size of data to be transmitted (transport block size, TBS). In an embodiment of the disclosure, the MCS may include 5 bits or more, or fewer than 5 bits. The TBS corresponds to a size of a transport block (TB) before channel coding for error correction is applied to a data TB to be transmitted by the base station.

In the disclosure, a transport block (TB) may include a medium access control (MAC) header, a MAC CE, one or more MAC service data units (SDUs), and padding bits. Alternatively, the TB may represent a MAC protocol data unit (PDU) or a data unit for transformation from a MAC layer to a physical layer.

Modulation schemes supported by the 5G or NR system are quadrature phase shift keying (QPSK), 16 quadrature amplitude modulation (QAM), 64QAM, and 256QAM, which correspond to modulation orders of 2, 4, 6, and 8, respectively. For example, 2 bits per symbol may be transmitted in the case of QPSK modulation, 4 bits per OFDM symbol may be transmitted in the case of 16QAM modulation, 6 bits per symbol may be transmitted in the case of 64QAM modulation, and 8 bits per symbol may be transmitted in the case of 256QAM modulation.

If PDSCH is scheduled according to the DCI, HARQ-ACK information indicating the success or failure of decoding the PDSCH is transmitted from the base station to the terminal via PUCCH. The HARQ-ACK information is transmitted in a slot indicated by a PDSCH-to-HARQ feedback timing indicator included in the DCI for scheduling of PDSCH, and values mapped respectively to PDSCH-to-HARQ feedback timing indicators of 1 to 3 bits are configured by higher layer signals, as shown in Table 4. If the PDSCH-to-HARQ feedback timing indicator indicates k, the terminal transmits HARQ-ACK information after k slots in slot n in which PDSCH has been transmitted, that is, in slot n+k.

TABLE 4

| PDSCH-to-HARQ feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

If the PDSCH-to-HARQ feedback timing indicator is not included in DCI format 1_1 for scheduling of the PDSCH, the terminal transmits the HARQ-ACK information in the slot n+k according to value k configured based on higher layer signaling. When HARQ-ACK information is transmitted on the PUCCH, the terminal transmits the HARQ-ACK information to the base station by using a PUCCH resource determined based on a PUCCH resource indicator included in the DCI for scheduling of the PDSCH. Here, an ID of the PUCCH resource mapped to the PUCCH resource indicator may be configured via higher layer signaling.

Figure 2:
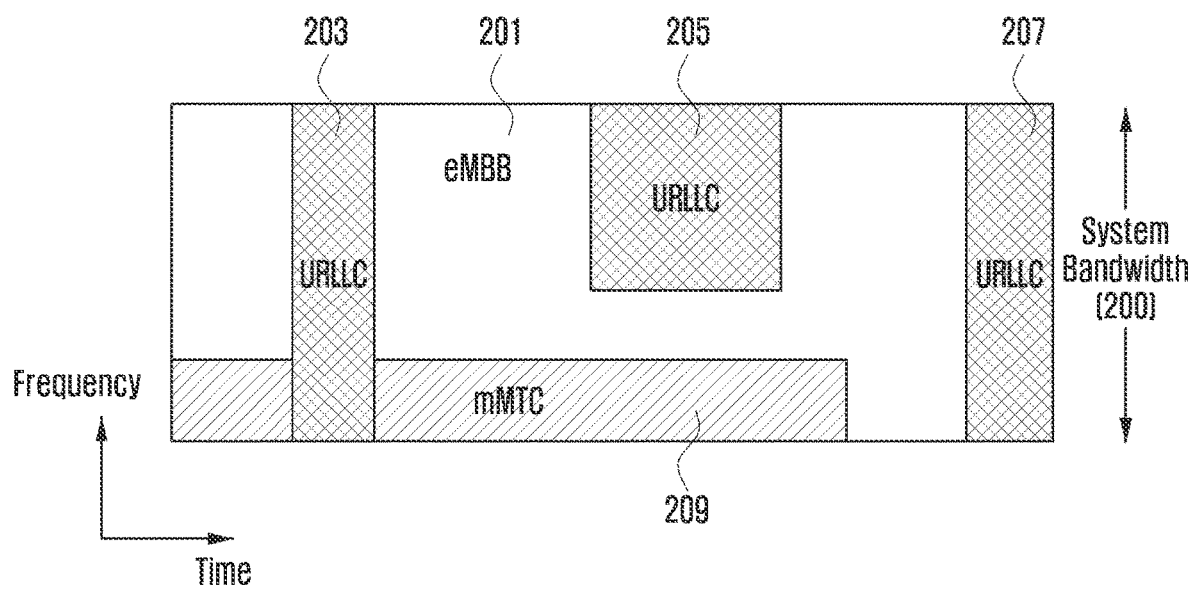
FIG. 2 is a diagram illustrating a procedure of assigning data for enhanced mobile broadband (eMBB), ultra-reliable and low-latency communications (URLLC), and massive machine type communications (mMTC) in a time-frequency resource region in a 5G or NR system according to an embodiment of the disclosure.

FIG. 2 is a diagram illustrating a procedure of assigning data for eMBB, URLLC, and mMTC in a time-frequency resource region in the 5G or NR system according to an embodiment of the disclosure.

Referring to FIG. 2, data for eMBB, URLLC, and mMTC may be assigned in an entire system frequency band 200. If URLLC data 203, 205, and 207 are generated and need to be transmitted while eMBB data 201 and mMTC data 209 are being assigned and transmitted in a specific frequency band, a transmitter may empty parts where the eMBB data 201 and the mMTC data 209 have already been assigned, or may transmit the URLLC data 203, 205, and 207 without transmitting the eMBB data 201 and the mMTC data 209. Among the above-mentioned services, the URLLC needs to reduce a latency time, and therefore the URLLC data may be assigned to a part of a resource to which the eMBB data or the mMTC has been assigned, so as to be transmitted. If the URLLC data is further assigned to and transmitted in the resource to which the eMBB data has been assigned, the eMBB data may not be transmitted in an overlapping time-frequency resource, and therefore transmission performance of the eMBB data may be lowered. For example, an eMBB data transmission failure due to URLLC assignment may occur.

Figure 3:
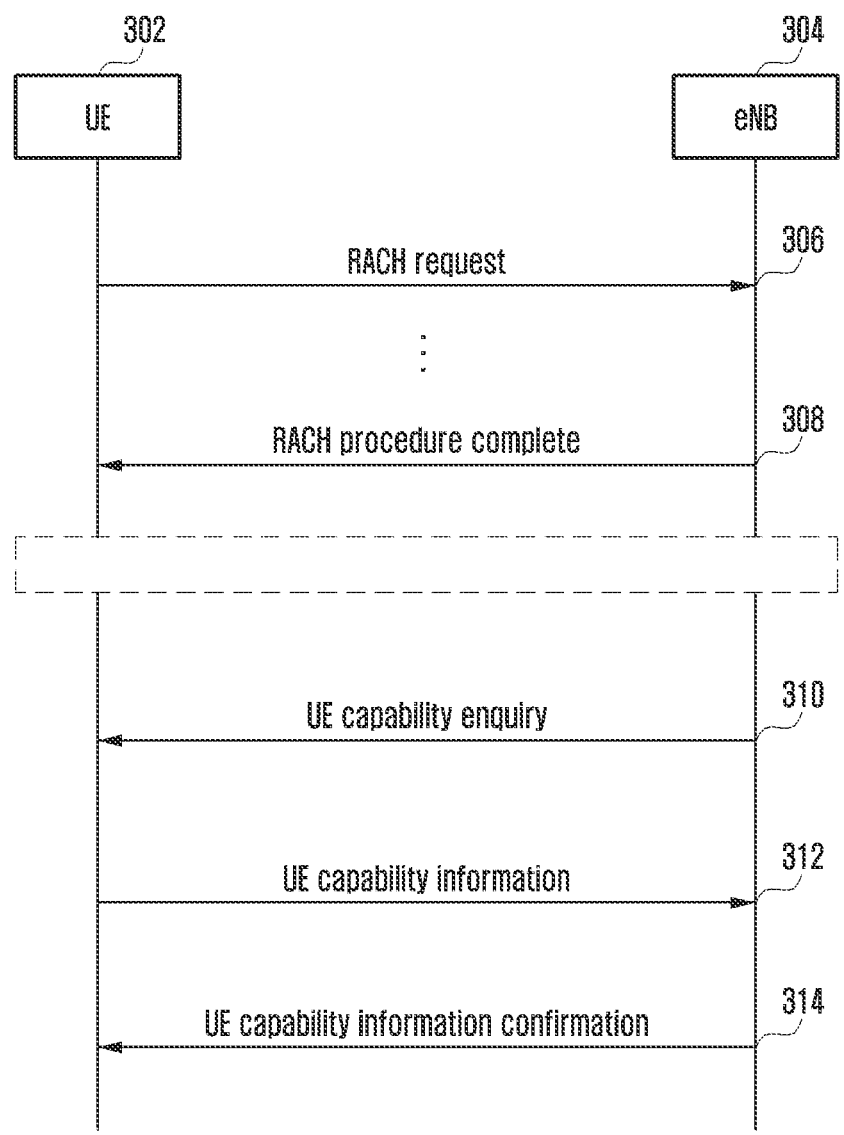
FIG. 3 is a diagram illustrating a procedure of reporting UE capability of a terminal to a base station after an initial access to the base station by the terminal according to an embodiment of the disclosure.

FIG. 3 is a diagram illustrating a procedure of reporting UE capability of a terminal to a base station after an initial access to the base station by the terminal according to an embodiment of the disclosure.

Referring to FIG. 3, for uplink synchronization or cell access, a terminal 302 transmits 306 random-access information to a base station 304 via a random-access channel (RACH). The base station successfully receives the random-access information transmitted from the terminal, finally succeeds in a random-access procedure via exchanging messages corresponding to the received random-access information, and transmits 308, to the terminal, a signal indicating that access to a cell has been completed. Thereafter, the base station transmits 310 UE capability enquiry request information to the terminal to determine what UE capability the terminal accessing the cell has. After receiving a corresponding UE capability enquiry, the terminal transmits 312 UE capability information held thereby to the base station via an uplink resource allocated by the base station. Then, the base station transmits 314, to the terminal, UE capability information confirmation information indicating that the base station has properly received the UE capability information. Types of UE capability described above may be as follows.

General parameter
Service data adaptation protocol (SDAP) parameter
Packet data convergence protocol (PDCP) parameter
Radio link control (RLC) parameter
Medium access control (MAC) parameter
Physical layer (PHY) parameter
For example, the PHY parameter may include at least a part of the following items.
Whether carrier aggregation (CA) is supported
Whether 60 kHz subcarrier spacing is supported
Whether extended cyclic prefix is supported
Whether code block group retransmission is supported
Maximum number of PDSCHs or PUSCHs which can be received in one slot
Whether scheduling/HARQ processing time capability 2 is supported
Number of supportable services (e.g., eMBB, URLLC, or mMTC)
Number of supported services desired by a terminal The base station may support optimal scheduling for each terminal via the UE capability information. More specifically, after the base station receives the UE capability information transmitted from the terminal, the base station may transmit additional DCI configuration information to the terminal via a higher signal, such as RRC signaling. For example, if the terminal reports to the base station that the terminal supports code block group (CBG) retransmission, the base station may be able to inform that DCI information searched by the terminal includes a code block group-related field, via the higher signal. The terminal may be able to determine which code block group is retransmitted based on data scheduled via corresponding DCI.

If one terminal is able to support one or more services, the base station may be able to include priority information in the DCI in order to efficiently schedule control information or data information to the corresponding terminal. The priority information may be related to each service. In order to include the priority information in the DCI, the base station may be able to consider one of the followings. The above-mentioned service refers to a service to which a specific requirement is given. One example of the specific requirement may include criteria, such as transmission reliability, transmission latency, transmission capacity, and the like. Different services mean that at least one requirement value is different, and if all requirements are the same, two services may be considered as the same service. The following describes information for confirmation of the number of services supportable by a terminal, and indicating priority information.

Method 1: In UE capability information, processing time capability 2, MCS table 3, the number of PDSCHs/PUSCHs per slot, which can be received by TDM, PDCCH monitoring conditions, the maximum number of PDSCHs that can be concurrently received, the presence of absence of CA resources, or the like.

Method 2: In UE capability information, the number of services supportable by a terminal Method 3: In UE capability information, the number of services that a terminal desires to support.

Among the above-described methods, method 1 is a method in which a base station indirectly determines the number of services supportable by a terminal, based on UE capability information reported by the terminal. Method 2 is a method in which a terminal directly reports the number of services supportable by the terminal, and therefore a base station directly determines the number of services supportable by the terminal. Method 3 is similar to method 2. However, in method 2, it is possible that priority-related information configured by the base station via a final higher signal is different from the number of services reported by the terminal, whereas in method 3, in accordance with the number of services reported by the terminal, the base station unconditionally indicates, to the terminal, priority-related information corresponding to the number via a higher signal. For example, according to method 2, if the terminal reports the number of supportable services is 5, the base station may configure the priority-related information by assuming that the number of services is 4, whereas according to method 3, if the terminal reports that the number of supportable services is 5, the base station should configure the priority-related information according to the case where the number of services is 5.

Method 1 and 2 may enable determination of the number of services to be provided directly to the terminal by the base station. For example, if the base station determines to provide a total of four services to the terminal, the base station may assign two bits of field information indicating priority, to the DCI field via the higher signal. In the case of method 3, the terminal directly reports the number of services that the terminal wants to receive. For example, if the terminal reports, to the base station, that the terminal wants to receive a total of four services, the base station may assign two bits of field information indicating priority, to the DCI field via a higher signal. More generally, if the number of services determined by methods 1 to 3 is N, the DCI field including priority information may have a ceil (log$_2$ [N]) bit size.

As another example, if the number of services determined by methods 1 to 3 is N, it may be possible that a priority and an HARQ process ID of the DCI field are implicitly mapped. More specifically, it may be possible to have a smaller HARQ process ID or a larger HARQ process ID as the priority is higher. Alternatively, the base station may be able to separately map a priority value for each HARQ process ID, and in this case, the HARQ process ID and a priority mapping relationship may be configured via the higher layer signal. In addition to the HARQ process ID, it may be possible to implicitly inform the priority information to another DCI field, such as MCS index information, among DCI fields.

In accordance with the above-described priority, if a collision occurs in terms of time or frequency resources with respect to data or control information scheduled from the base station, the terminal may use the above-described priority to determine which data or control resource should be given priority. A detailed description of a method of using priority will be provided based on FIG. 4. In FIG. 3, a method of informing a terminal of priority-based information by a base station based on UE capability is mainly described. Although partially described above, the priority information may be indicated in at least one of following methods.

1. DCI field directly indicating priority information: For example, two bits may indicate priority information for a total of four pieces of scheduling information.
2. Implicitly including priority information in an existing DCI field: For example, HARQ process IDs are determined to be mapped to priorities, and if there are a larger number of HARQ process IDs compared to a priority information size, it may be possible to map priorities to the HARQ-process IDs via modular operation. Particularly, a mod (HARQ-process ID/N) value may be a priority of corresponding scheduling information. Here, N is a size of the priority information (i.e., a maximum value that the priority information may indicate). As another example, the base station may be able to map individual HARQ-process IDs and associated priority information values via the higher signal.
3. DCI format: It may be possible that priority information or a priority varies for each DCI format.
4. RNTI: It may be possible that priority information or a priority is changed by the RNTI scrambled in DCI.
5. CORESET information: It may be possible that priority information or a priority varies according to CORESET configuration information.
6. Combination of the above-described methods: For example, it may be possible to divide two priority groups according to a DCI format, and to divide priority by a DCI field indicating priority information within the DCI format. For example, DCI format A may have a higher priority than DCI format B, and a priority within DCI format A may be further determined by a value indicating priority information in the DCI field. Such a combination is merely an example, and a priority may be determined by the combination described above.

Figure 4:
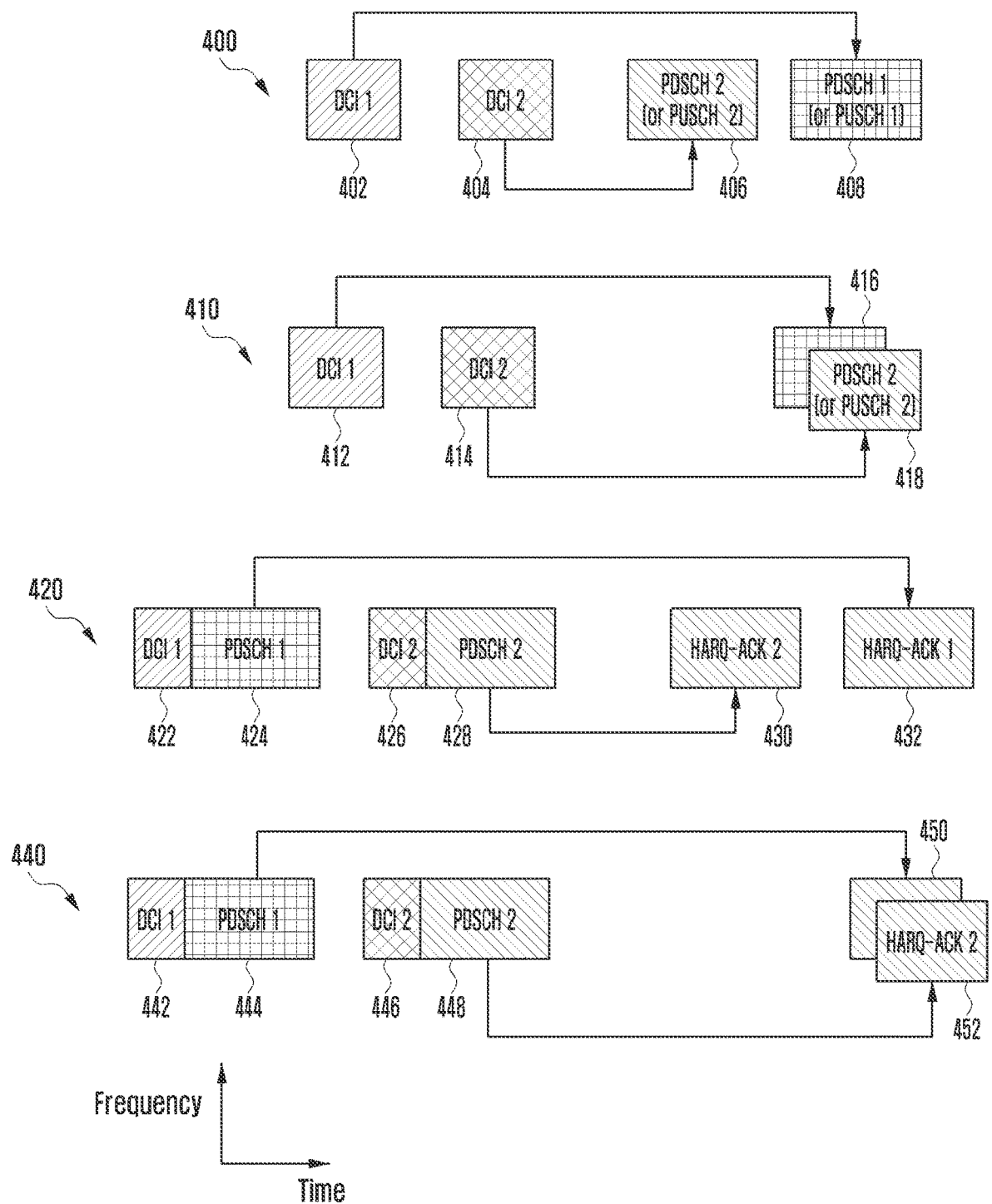
FIG. 4 is a diagram illustrating a method of transmitting data information or control information of a terminal based on a priority according to an embodiment of the disclosure.

FIG. 4 is a diagram illustrating a method of transmitting data information or control information of a terminal based on a priority according to an embodiment of the disclosure.

Referring to FIG. 4, reference numeral 400 illustrates a situation in which DCI 1 402 and DCI 2 404, which are transmitted from a base station, schedule PDSCH 1 408 and PDSCH 2 406 (or PUSCH 1 and PUSCH 2), respectively. FIG. 4 illustrates an example in which a base station transmits DCI 1 first and DCI 2 later in terms of time, but the disclosure is applicable not only in a case where DCI 2 is transmitted after transmission of DCI 1, but also in a case where a start symbol of DCI 1 is earlier than DCI 2. In this case, DCI 1 transmission and DCI 2 transmission may partially overlap in time. FIG. 4 shows a situation in which PDSCH 1 (or PUSCH 1) scheduled in DCI 1 is transmitted after PDSCH 2 (or PUSCH 2) scheduled in DCI 2. The disclosure is applicable not only in a case where PDSCH 2 is transmitted before PDSCH 1, but also in a case where a start symbol of PDSCH 2 is earlier than that of PDSCH 1, and in this case, transmissions of PDSCH 1 and PDSCH 2 may partially overlap in time.

Referring to FIG. 4, a situation of reference numeral 410 is similar to that of reference numeral 400, but reference numeral 410 illustrates an example in which PDSCH 2 418 (or PUSCH 2) scheduled in DCI 2 414 conflicts (or overlaps) with a part of a resource region of PDSCH 1 416 (or PUSCH 1) scheduled in DCI 1 412. In reference numeral 410, although a situation in which time and frequency resource regions are both overlapped, a case where only the time resource region is overlapped may also be the case. Further, a case where the start symbol of PDSCH 2 and the start symbol of PDSCH 1 are the same or the start symbol of PDSCH 2 is located after the start symbol of PDSCH 1 may also correspond to the case of reference numeral 410.

Criteria for determining the overlap of the time and frequency resource regions for each terminal may be different. For example, if the terminal is capable of receiving two or more PDSCHs or transmitting a PUSCH in one symbol, the terminal may not make a determination of overlap when two PDSCHs or PUSCHs overlap each other only in some time resource regions. The terminal may make a determination of overlap when both time and frequency resource regions overlap. On the other hand, if the terminal is unable to receive two or more PDSCHs or transmit a PUSCH in one symbol, the terminal may make a determination of overlap when two PDSCH or PUSCH resources overlap at least in the time resource regions. In other words, criteria for determining whether PDSCHs or PUSCHs overlapping in the time and frequency resource regions overlap may vary according to UE capability of the terminal Referring to FIG. 4, reference numeral 420 illustrates an example in which PDSCH 1 424 and HARQ-ACK 1 432 for PDSCH 1 424 are scheduled in DCI 1 422, and PDSCH 2 428 and HARQ-ACK 2 430 for PDSCH 2 428 are scheduled in DCI 2 426. Although reference numeral 420 illustrates the case where DCI 1 and PDSCH 1 are ahead of DCI 2 and PDSCH 2 in time, it may be sufficiently possible that DCI 2 is ahead of PDSCH 1 in time or transmitted (overlapped) in one or more of the same symbols. Although a case where HARQ-ACK 2 is ahead of HARQ-ACK 1 in time is illustrated, a case where a start symbol of HARQ-ACK 2 is earlier than a start symbol of HARQ-ACK 1 may also be sufficiently included in reference numeral 420.

Referring to FIG. 4, reference numeral 440 is similar to reference numeral 420, but reference numeral 440 illustrates an example in which HARQ-ACK 1 450 information for PDSCH 1 444 scheduled by DCI 1 442 overlaps with HARQ-ACK 2 452 information for PDSCH 2 448 scheduled by DCI 2 446 in terms of the time or frequency resource domain. If two PDSCHs are PDSCHs scheduled with the same priority, HARQ-ACK information may be multiplexed and transmitted to the base station in one HARQ-ACK codebook. However, if two PDSCHs have different priorities (or reliability), since HARQ-ACK information may also have different requirements, a different operation from a foregoing situation may be required.

The above-described PDSCH may be a PDSCH requesting HARQ-ACK information. Alternatively, the PDSCH may be a PDSCH scheduled with DCI including a CRC scrambled with C-RNTI and MCS-RNTI. Reference numerals 400 and 420 indicate out-of-order HARQ, that is, a case where the terminal neither receives PDSCH nor transmits PUSCH or HARQ-ACK in scheduled order (or order of transmitting DCI), but receives PDSCH or transmits PUSCH or HARQ-ACK in order differing from the order of receiving DCI. Such operations are all not supported in Release 15 (Rel-15) NR.

Operations of reference numeral 410 are operations that are not defined in Rel-15 NR, and the terminal does not prioritize any DCI, PDSCH or PUSCH, and considers the operations as an error case. In case of reference numeral 440, in Rel-15 NR, an operation of, if HARQ-ACK information is overlapped, multiplexing the HARQ-ACK information and transmitting one piece of the HARQ-ACK information to PUCCH or PUSCH is defined. However, if two pieces of HARQ-ACK information correspond to PDSCHs having different priorities, requirements may vary for each HARQ-ACK information. This may result a situation that requires prioritizing.

In the disclosure, in FIG. 3, conditions of supporting the operations of 400, 410, 420, and 440 based on the above-described priority correspond to a case where DCI 2 has a higher priority than DCI 1 and, specifically, such conditions may be the same as at least one of the following cases.

DCI field including priority information: High priority means that, if priority information is explicitly present in DCI fields, a value of a corresponding field is greater. For example, priority may be determined to be high when a priority field value is greater. In other words, if a priority field value of DCI 2 is greater than a priority field value of DCI 1, DCI 2 may have a higher priority than DCI 1. (also applicable in an opposite situation)

HARQ process ID: If priority information is associated with an HARQ process ID, DCI 2 including an HARQ process ID associated with a high priority information value may have a higher priority than DCI 1 including an HARQ process ID associated with a relatively lower priority information value.

DCI format: If a DCI format of DCI 2 has a higher priority than a DCI format of DCI 1, the priority of DCI 2 may be higher than that of DCI 1.

RNTI: If RNTI scrambled in CRC of DCI 2 has a higher priority than RNTI scrambled in CRC of DCI 1, the priority of DCI 2 may be higher than that of DCI 1.

In other words, the above-described conditions indicate conditions that support a corresponding scheduling scheme (out-of-order HARQ) in the case of reference numerals 400 and 420, and indicate conditions of supporting an operation of, when the conditions are allowed, canceling pre-scheduled PDSCH 1 reception or canceling PUSCH 1 or HARQ-ACK 1 transmission, in the case of reference numerals 410 and 440.

Specifically, the terminal may expect scheduling as shown in reference numeral 400 or 420 only when DCI 2 has a higher priority than DCI 1. On the other hand, the terminal may not expect scheduling as shown in reference numeral 400 or 420 if the priority of DCI 2 is equal to or lower than that of DCI 1. In the case where the priority of DCI 2 is equal to or lower than that of DCI 1, the terminal scheduled as shown in reference numeral 400 or 420 may assume the case as an error, and it may be possible to disregard a data transmission resource scheduled in 404 or 426, or to disregard all data transmission resources scheduled in 404 and 402 or 422 and 426. Specifically, the terminal may expect a situation, such as in reference numerals 410 to 440, only if DCI 2 has a higher priority than DCI 1, wherein the terminal may expect to cancel PDSCH 1 reception or PUSCH 1 transmission in the case of reference numeral 410 and to cancel HARQ-ACK 1 transmission in the case of reference numeral 440. Cancellation of the scheduled PDSCH reception may mean that, even if the PDSCH has been scheduled, the terminal does not receive the PDSCH due to reception of another PDSCH, and as a result, NACK including the HARQ-ACK information corresponding to the PDSCH is transmitted. In addition, the terminal may not be able to transmit HARQ-ACK information itself The situation is applicable, for a bit including HARQ-ACK information, if only a bit corresponding to the canceled PDSCH exists.

Figure 5A:
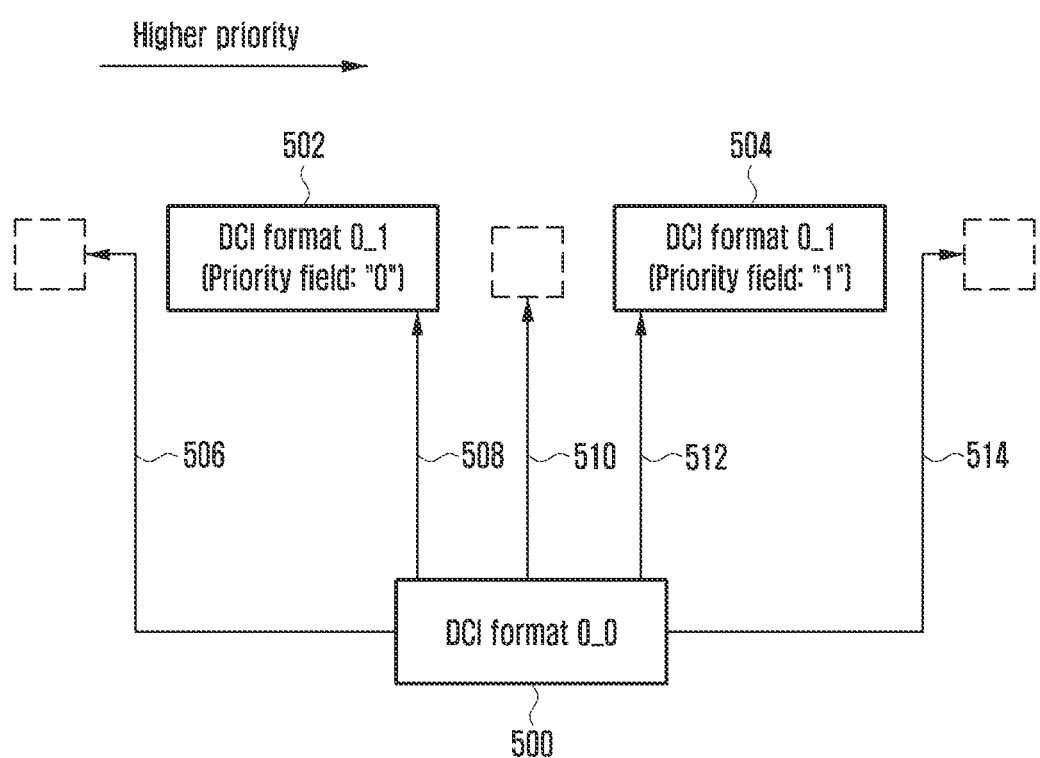
FIG. 5A is a diagram illustrating a priority relationship of fallback downlink control information (DCI) and non-fallback DCI according to an embodiment of the disclosure.

FIG. 5A is a diagram illustrating a priority relationship of fallback DCI and non-fallback DCI according to an embodiment of the disclosure.

Referring to FIG. 5A, a situation in which priority information is included in a DCI field by default is considered. For example, if a terminal supports a plurality of services and each service has a different priority, a base station may be able to add priority information in DCI via a higher signal. However, DCI capable of changing, adding, or deleting DCI field information via the higher signal is limited to non-fallback DCI. An example of non-fallback DCI may correspond to DCI format 1_1 enabling to schedule PDSCH of Rel-15 NR or DCI format 0_1 enabling to schedule PUSCH. On the other hand, DCI that is not changed due to a higher signal, or the like, is referred to as fallback DCI. For example, DCI format 1_0 enabling to schedule PDSCH of Rel-15 NR or DCI format 0_0 enabling to schedule PUSCH may correspond to fallback DCI.

Therefore, there is a need to define a priority relationship between fallback DCI and non-fallback DCI including priority information with respect to the fallback DCI that does not include priority information. More specifically, if a PUSCH (or PDSCH or HARQ-ACK for the PDSCH (which may be interchangeable used with PUCCH on which HARQ-ACK is transmitted)) scheduled based on non-fallback DCI overlaps at least partly with a resource region of a PUSCH (or PDSCH or HARQ-ACK) scheduled based on fallback DCI, the terminal needs to determine which PUSCH (or PDSCH or HARQ-ACK) should be prioritized among PUSCHs (or PDSCHs or HARQ-ACKs) that overlap each other. It may be necessary to determine whether scheduling with fallback DCI can be allowed for out-of-order scheduling in a situation where the base station schedules the PUSCH (or PDSCH) with non-fallback DCI having a specific priority value. Therefore, it is possible to configure the priority relationship between fallback DCI and non-fallback DCI by at least one of the following methods.

If high priority DCI and DCI having a lower priority schedule a PDSCH (or PUSCH or PUCCH) in which at least some OFDM symbols overlap in terms of time resources, the terminal processes the PDSCH (or PUSCH or PUCCH) scheduled in the high priority DCI, and disregards (or drops) the PDSCH (or PUSCH or PUCCH) scheduled in the low priority DCI. If two pieces of DCI having the same priority schedule a PDSCH (or PUSCH or PUCCH) in which at least some OFDM symbols overlap in terms of time resources, the terminal processes a PDSCH (or PUSCH or PUCCH) scheduled in DCI transmitted later in time, and disregards (or drops) a PDSCH (or PUSCH or PUCCH) scheduled in DCI transmitted first in time.

A method of determining whether the DCI is transmitted later or first in time may be performed based on a first symbol of CORESET including the DCI. Specifically, in a first symbol of first DCI and a first symbol of second DCI, if the first symbol of the first DCI is ahead of the first symbol of the second DCI in the time domain, it may be determined that the first DCI is ahead in time. Alternatively, the method of determining whether the DCI is transmitted later or first in time may be performed based on a last symbol of CORESET including the DCI. For example, specifically, in a last symbol of the first DCI and a last symbol of the second DCI, if the last symbol of the first DCI is ahead of the last symbol of the second DCI in the time domain, it may be determined that the first DCI is ahead in time.

Method 1: Fallback DCI has lower priority than non-fallback DCI. For example, regardless of a priority field value in the non-fallback DCI, the non-fallback DCI always takes precedence over the fallback DCI. Accordingly, the terminal may expect that a PDSCH (or PUSCH or HARQ-ACK) scheduled based on the fallback DCI may be canceled by a PDSCH (or PUSCH or HARQ-ACK) scheduled based on the non-fallback DCI. The non-fallback DCI may enable out-of-order HARQ scheduling for the fallback DCI. The out-of-order HARQ scheduling refers to reference numerals 400 and 420 of FIG. 4. For example, in reference numerals 400, 410, 420, and 440 of FIG. 4, DCI 1 may be fallback DCI, and DCI 2 may be non-fallback DCI.

Method 2: Fallback DCI has a higher priority than non-fallback DCI. For example, regardless of a priority field value in the non-fallback DCI, the fallback DCI always takes precedence over the non-fallback DCI. Accordingly, the terminal may expect that a PDSCH (or PUSCH or HARQ-ACK) scheduled based on the non-fallback DCI may be canceled by a PDSCH (or PUSCH or HARQ-ACK) scheduled based on the fallback DCI. The fallback DCI may enable out-of-order HARQ scheduling for the non-fallback DCI. The out-of-order HARQ scheduling refers to reference numerals 400 and 420 of FIG. 4. For example, in reference numerals 400, 410, 420, and 440 of FIG. 4, DCI 1 may be non-fallback DCI, and DCI 2 may be fallback DCI.

Method 3: A priority relationship between fallback DCI and non-fallback DCI may be defined by a separate higher signal. In other words, priority of the fallback DCI may always be higher than, lower than, or in the middle of the non-fallback DCI according to the higher signal. FIG. 5A illustrates an example of a priority relationship that may be established between fallback DCI and non-fallback DCI. FIG. 5A illustrates a priority relationship of DCI format 0_0 500, in the fallback DCI, for scheduling of PUSCH. If a priority field indicating priority of DCI format 0_1 502 or 504 that is non-fallback DCI is 1 bit, and DCI format 0_1 504 with a value of 1 takes precedence over DCI format 0_1 502 with a value of 0, the base station may be able to inform the terminal, via a higher signal, of the priority that the DCI format 0_0 has in comparison with DCI format 0_1.

In other words, the base station may be able to configure, via a higher signal, that the priority of DCI format 0_0 may be set to 506, 508, 510, 512, or 514, and the terminal may determine the priority of DCI format 0_0 via the higher signal. For example, if the priority of DCI format 0_0 is configured to 508 via the higher signal, the terminal may determine that the priority of DCI format 0_0 has the same priority relationship as that of DCI format 0_1 having a priority value of 0. If the priority of DCI format 0_0 is configured to 512 via the higher signal, the terminal may determine that the priority of DCI format 0_0 has the same priority relationship as that of DCI format 0_1 having a priority value of 1. If the priority of DCI format 0_0 is configured to 506 via the higher signal, the terminal may determine that DCI format 0_0 always has a lower priority than DCI format 0_1. If the priority of DCI format 0_0 is configured to 514 via the higher signal, the terminal may determine that DCI format 0_0 always has a higher priority than DCI format 0_1. If the priority of DCI format 0_0 is configured to 510 via the higher signal, the terminal may determine that DCI format 0_0 has a lower priority than DCI format 0_1 having a priority value of 1 and has a higher priority than DCI format 0_1 having a priority value of 0.

Referring to FIG. 5A, the method of configuring DCI format 0_0 is merely an example, only at least one piece of configuration information in 506, 508, 510, 512, and 514 may exist, and the terminal may be able to receive corresponding information via the higher signal.

Method 4: Priorities of fallback DCI and non-fallback DCI may vary according to a search space in which DCI is received. For example, fallback DCI detected in a common search space may have a lower priority than non-fallback DCI and fallback DCI detected in a terminal-specific search space (UE-specific search space). As another example, the fallback DCI detected in the common search space may be able to have a higher priority than the fallback DCI detected in the UE-specific search space. As still another example, similar to method 3, the base station may be able to separately configure the priority of the fallback DCI detected in the common search space and the priority of the fallback DCI detected in the UE specific search space. As still another example, it may be possible that the fallback DCI detected in the common search space conforms to method 1 or method 2, and the fallback DCI detected in the UE specific search space conforms to method 3. The above-described methods are merely examples, and other methods for separately configuring fallback DCI detected for each search space may be possible.

In addition, a priority relationship between fallback DCI and non-fallback DCI may be determined using a combination of one or more methods described in the disclosure.

The above-described methods may be applicable only to a terminal that does not support receiving two or more PDSCHs (or unicast PDSCHs) requesting HARQ-ACK feedback concurrently in one cell. In addition, the above-described methods may be applicable only to a terminal that does not support transmission of two or more PUSCHs concurrently in one cell.

Figure 5B:
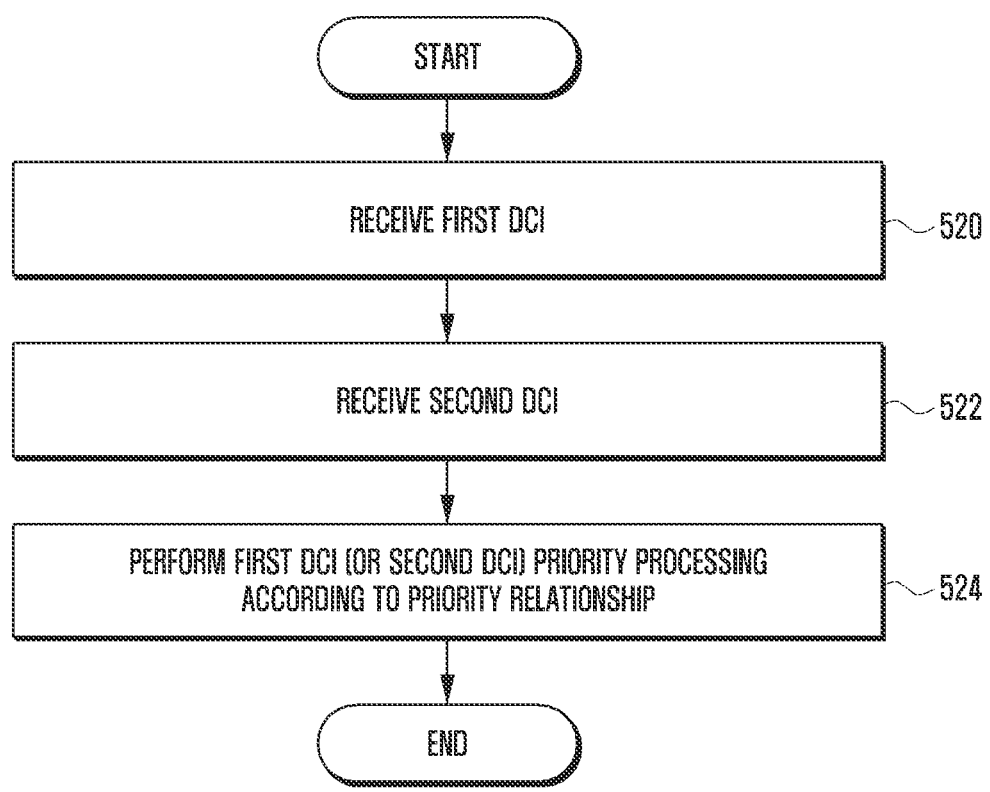
FIG. 5B is a diagram illustrating a method of checking a priority by a terminal via first DCI and second DCI according to an embodiment of the disclosure.

FIG. 5B is a diagram illustrating a method of checking a priority by a terminal via first DCI and second DCI according to an embodiment of the disclosure.

Referring to FIG. 5B, first, the terminal receives first DCI in operation 520, and receives second DCI in operation 522. If the first DCI is fallback DCI and the second DCI is non-fallback DCI, the terminal determines whether to give priority to the first DCI or the second DCI according to the methods described above in FIG. 5B. If the first DCI is given priority, the terminal disregards (or drops) a PDSCH (or PUSCH or PUCCH) resource for scheduling in the second DCI. Alternatively, if the second DCI is given priority, the terminal disregards (or drops) a PDSCH (or PUSCH or PUCCH) resource for scheduling in the first DCI. In other words, the terminal operates only according to scheduling information for the DCI with priority. In operation 524, the terminal performs first DCI (or second DCI) priority processing according to priority relationship.

Figure 6A:
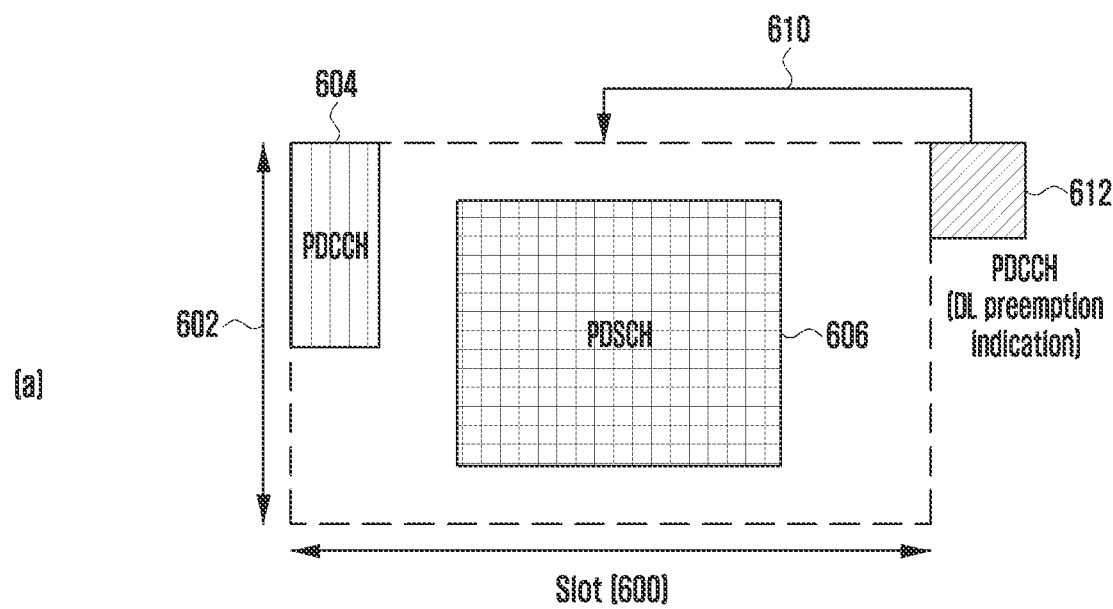
FIG. 6A is a diagram illustrating a relationship between DCI including priority information and DCI including preemption information according to an embodiment of the disclosure.
Figure 6A:
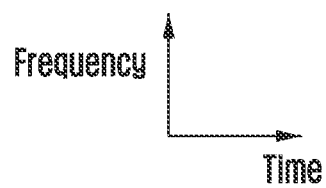
Figure 6A:
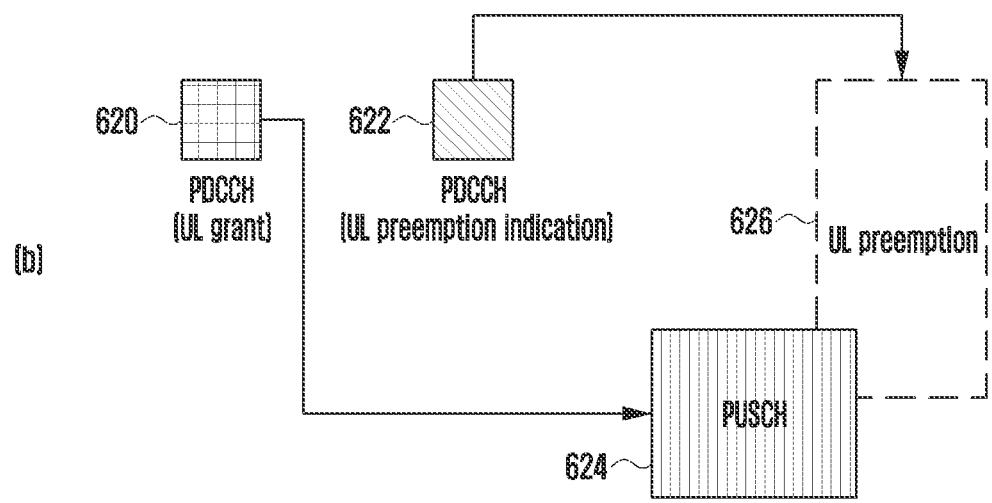

FIG. 6A is a diagram illustrating a relationship between DCI including priority information and DCI including preemption information according to an embodiment of the disclosure.

Referring to 6A, specifically, (a) of FIG. 6A illustrates a case of DL preemption. In Rel-15 NR, preemption means that a part of a resource region of a previously scheduled PDSCH is not actually transmitted (or a part of the resource region of the PDSCH is not actually used for transmission). Specifically, although the base station has scheduled a PDSCH for an eMBB terminal, if a part of a corresponding PDSCH resource region is used for a URLLC terminal requiring an urgent service, the base station may be able to allocate the PDSCH for the URLLC terminal in a part or all of the resource region. However, since the eMBB terminal does not know that all or a part of the scheduled PDSCH resource region is used for the URLLC terminal, the base station needs to notify the eMBB terminal of the corresponding information. This information is a preemption indication. If the base station does not notify of the information, the eMBB terminal may determine the PDSCH, which is scheduled by the base station for the URLLC terminal, to be data of the eMBB terminal, and may perform demodulation and/or decoding, thereby reducing efficiency of demodulation and decoding.

In Rel-15 NR, the preemption indication may indicate, in terms of time and frequency, a location at which preemption has occurred for (2 to 4) slots or a slot immediately before transmission of the indicator. Specifically, time information indicates a position of a symbol or symbol group preempted into 14 bitmaps, and frequency information indicates frequency equalization that is preempted, by dividing of an active frequency band part (BWP) that is configured to the terminal Such preemption indication information may be concurrently transmitted to one or more group terminals as terminal common control information of DCI format 2_1.

This example is illustrated in FIG. 6A. The terminal receives a scheduled PDSCH 606 via a DCI format in a PDCCH 604, and confirms that the PDSCH has been scheduled. DCI format 2_1 612, which is a preemption indication, may be able to indicate 610 in which resource region in an immediately preceding slot section 600 and an active bandwidth section 602 preemption has occurred. In order to receive corresponding DCI format 2_1, the terminal periodically performs monitoring according to a base station configuration. However, if no preemption occurs, the base station may not actually transmit DCI format 2_1 to terminals of a corresponding group.

In the above situation, it may be possible that DCI format 2_1 612, which is the preemption indication, is not applied to the PDSCH 606 according to a priority value of the DCI format in the PDCCH 604 for scheduling of the PDSCH 606. For example, if the PDSCH 606 corresponds to a service having a highest priority, even if the terminal receives DCI format 2_1 612 and the preemption indication indicates a part of a region of the PDSCH 606, the terminal may be able to determine that the information does not correspond to the terminal itself Since DCI format 2_1 612 is terminal group common information, from the standpoint of the base station, a situation may occur in which terminals of a group receiving DCI format 2_1 concurrently receive services having different priorities. In this situation, higher signal reconfiguration is required to configure monitoring deactivation of DCI format 2_1 of specific terminals, and since this configuration is not dynamic (that is, not immediate in time), an additional operation is required so that the preemption region indicated by DCI format 2_1 does not apply to a terminal receiving a PDSCH having a high actual priority, as described above. Since preemption itself means that a part of a resource region of a PDSCH having a low priority can be used for a PDSCH having a high priority, the additional operation is required to prevent a part of the PDSCH having a high priority from being used for the PDSCH having a low priority reversely. Therefore, the terminal may perform an operation of using or not using the preemption indication according to the priority included in the DCI format for scheduling of the PDSCH. Specifically, the following methods may be performed for the operation.

Method 1: Regardless of a priority, a preemption region indicated by a preemption indication for DCI format 0_0 or 0_1 for scheduling of a PDSCH may be considered valid. In this case, the terminal considers that the PDSCH is not transmitted in the preemption region indicated by the indication regardless of the priority of DCI.

Method 2: The base station may individually configure, via a higher signal, whether a preemption region indicated by a preemption indication is valid for a PDSCH scheduled based on DCI format 0_1 or DCI format 0_0 which has a certain priority value.

Method 2 may be specifically performed as follows. If there are a total of four values indicating a priority, the base station may be able to inform whether the preemption indication is valid for a PDSCH indicated by DCI corresponding to particular values among the four priority indicating values. For example, if a field indicating priority of non-fallback DCI for scheduling of a PDSCH is 2 bits, it may be configured that preemption may be applied to the PDSCH scheduled based on the non-fallback DCI including a value of "00" or "01". Accordingly, the terminal may monitor a preemption indication, and may determine the indicated preemption indication to be valid for the PDSCH (scheduled by DCI including a priority value of 00 or 01). Preemption cannot be applied to a PDSCH scheduled based on non-fallback DCI including a value of "10" or "11". Accordingly, the terminal may monitor a preemption indication, and may determine the indicated preemption indication to be invalid for the PDSCH.

Such configurations may be performed via a higher layer signal. For example, the higher layer signal may indicate information on priority to which a preemption indication is applied or not applied, and the information on the priority may be priority included in DCI or may be information related to another priority (for example, DCI format, RNTI, or the like). The base station may be able to configure, via the higher signal, whether a preemption region indicated by the preemption indication is valid also for a PDSCH scheduled based on fallback DCI.

If the terminal receives DCI, to which a DL preemption indication is not applied, it may be possible to skip searching for the preemption indication separately. For example, the terminal may not monitor DCI format 2_1 including a preemption indication and a CRC scrambled with interruption RNTI (INT-RNTI) via blind decoding. This is because, even if the terminal receives the preemption indication, since the preemption indication is not applicable to the PDSCH scheduled by the corresponding DCI, it is more effective to skip the preemption indication to reduce power consumption from a terminal operation point of view.

A similar method is applicable to UL preemption that is similar to DL preemption. DL preemption is information indicating that a part of the resource region of the PDSCH received by the terminal corresponds to no transmission, whereas UL preemption is information indicating that a part of the resource region of the PUSCH to be transmitted by the terminal should not be used for actual transmission. Therefore, DL preemption is information transmitted from the base station after the terminal receives an actual PDSCH, but UL preemption is information that the terminal should check before or during transmission of the actual PUSCH. Similar to DL preemption, UL preemption may be used as information indicating that a specific resource region corresponds to no transmission. The terminal having received UL preemption may perform three possible operations as follows.

1. If at least a part of a PUSCH resource overlaps with a resource region indicated in UL preemption, the terminal cancels corresponding PUSCH transmission.
2. If a scheduled PUSCH resource region overlaps with a resource region indicated in UL preemption at least in terms of time resources, the terminal performs PUSCH transmission only on resources remaining after excluding the overlapping resource region.
3. If a scheduled PUSCH resource region overlaps with a resource region indicated in UL preemption at least in terms of time resources, the terminal cancels PUSCH transmission for the overlapping resource area and all subsequent corresponding resource regions. For example, the terminal performs PUSCH transmission only in a PUSCH resource region immediately before the overlapping resource region.
(b) of FIG. 6A illustrates a UL preemption operation. After receiving a UL grant for scheduling of a PUSCH 624 in a PDCCH 620, the terminal receives information indicating UL preemption in another PDCCH 622. If a resource region indicated by UL preemption information is a forbidden transmission region, the region may include a time and a frequency resource region, as shown in reference numeral 626 of FIG. 6A. If resource regions of 626 and 624 overlap at least in terms of time resources, the terminal may be able to take at least one of the three operations described above.

If the terminal supports a plurality of services, when the terminal receives a UL grant (DCI) including specific priority information, the terminal may be able to disregard preemption information in PUSCH transmission even if the terminal acquires the UL preemption information. For example, when the terminal receives a UL grant including highest priority information and transmits a PUSCH therefor, the terminal may receive UL preemption in another PDCCH and, even if a resource region indicated by the preemption overlaps with the PUSCH resource region, the terminal may disregard the overlap and may be able to transmit data in the scheduled PUSCH resource.

For example, similar to a method of configuring a relationship between DL preemption and DCI information having priority information, in a case of UL preemption, the base station may also configure a priority level to which UL preemption can be applied in advance. For example, if UL preemption is applicable only to priority information of "00" existing in a DCI field, and a PUSCH scheduled based on DCI including the priority information of "00" overlaps at least partially with a resource region indicated by UL preemption, the terminal may be expected to perform at least one of the three methods described above. If the terminal receives a PUSCH scheduled based on DCI including priority information other than the priority information of "00", and a corresponding PUSCH resource region overlaps at least partially with the resource region indicated by UL preemption, the terminal may disregard the overlap, and may be able to perform PUSCH transmission. Another possible method is that, if the terminal transmits a PUSCH scheduled based on DCI including priority information other than the priority information of "00", it may be possible not to detect UL preemption indication information that corresponds to a corresponding resource region. (For example, monitoring for receiving the UL preemption indication information may not be performed). This is because, even if the terminal acquires UL preemption information, the UL preemption information is not applied, so that power consumption may be reduced by avoiding reception in the first place.

Figure 6B:
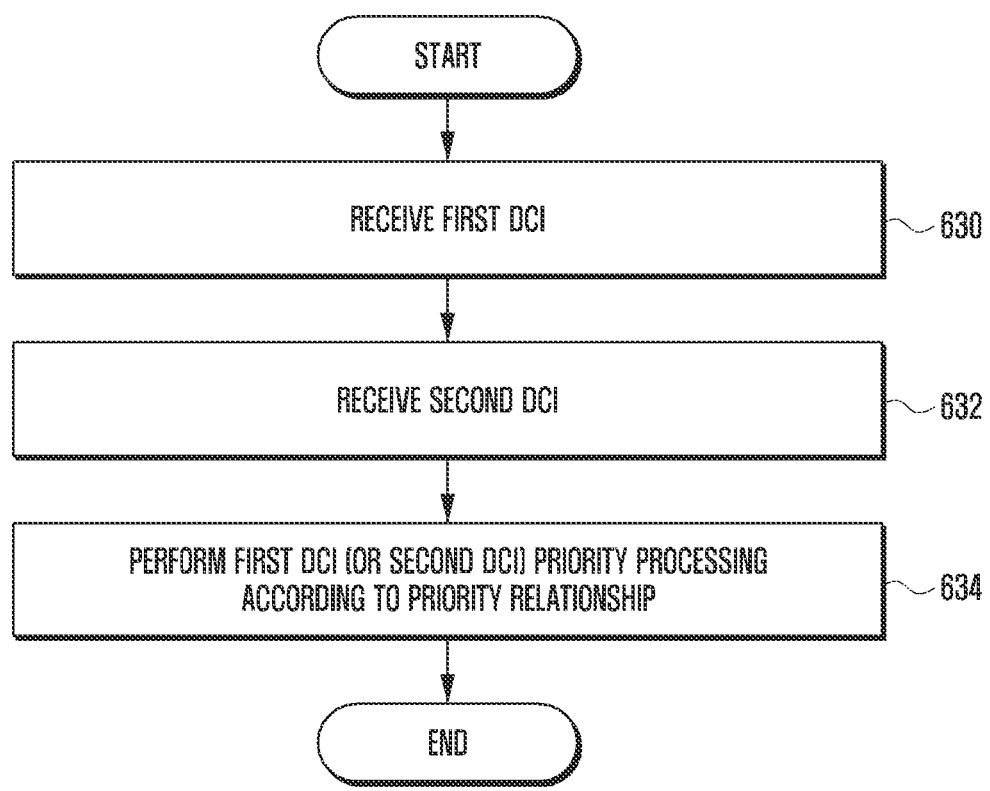
FIG. 6B is a diagram illustrating an operation of a terminal that receives DCI and preemption information according to an embodiment of the disclosure.

FIG. 6B is a diagram illustrating an operation of a terminal that receives DCI and preemption information according to an embodiment of the disclosure.

Referring to FIG. 6B, the preemption information may be the DL or UP preemption information described above. In operation 630, the terminal first receives first DCI. The first DCI may be control information for controlling of a PDSCH or a PUSCH. In operation 632, the terminal then receives second DCI. The second DCI may be DL preemption information indicating that a part of a resource region of the PDSCH corresponds to no transmission or may be UL preemption information indicating that a part of a resource region of the PUSCH corresponds to forbidden (or stopping) transmission. FIG. 6B illustrates an example of receiving UL preemption information after receiving DCI for scheduling of the PUSCH, but it may be possible to receive UL preemption information first.

The first DCI neither includes a separate field including priority information nor has priority information, like fallback DCI, but a priority relationship with non-fallback DCI including a priority information field may be directly or indirectly configured in advance. If the base station configures in advance, via a higher signal, that the second DCI indicating the DL or UL preemption information is applicable only to the first DCI having a certain priority value, the terminal may process, in operation 634, the PDSCH or PUSCH scheduled in the first DCI, based on information determined via the second DCI. The processing method is in accordance with the method described above. It may be possible to further include information indicating a priority value, based on which the preemption indication can be applied to higher level information that enables configuration of the second DCI.

Figure 7A:
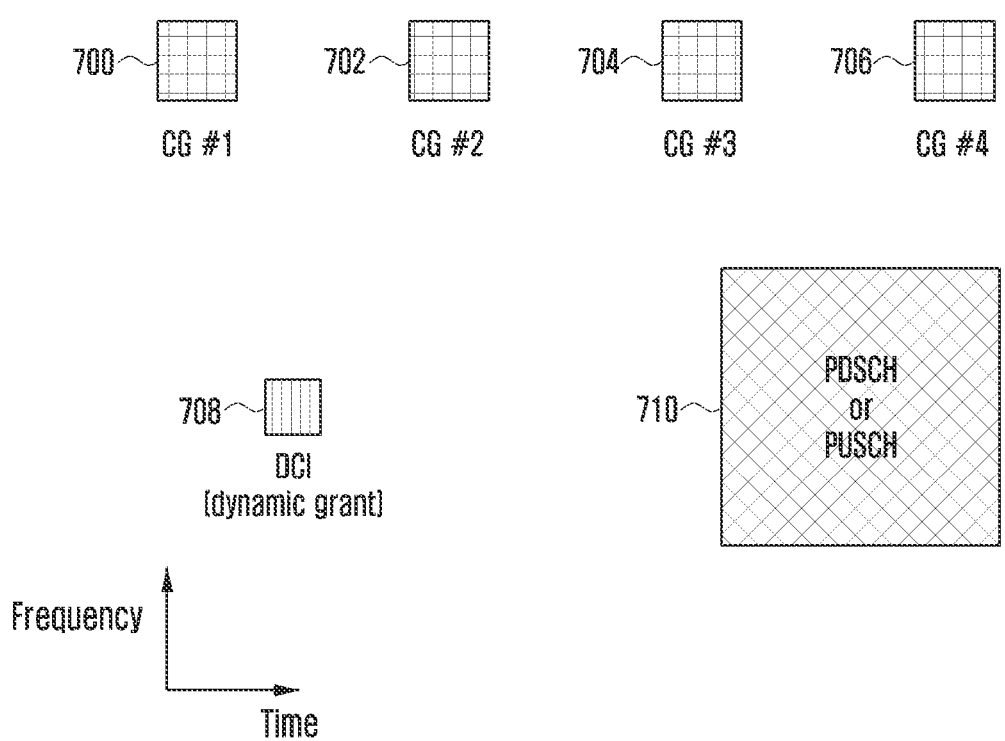
FIG. 7A is a diagram illustrating a priority relationship between a configured grant resource and a dynamic grant resource according to an embodiment of the disclosure.

FIG. 7A is a diagram illustrating a priority relationship between a configured grant resource and a dynamic grant resource according to an embodiment of the disclosure.

Referring to FIG. 7A, in a situation where configured grant (CG) resources 700, 702, 704, and 706 enabling uplink data transmission or downlink data reception without separate DCI are periodically configured, if PDSCH or PUSCH 710 scheduled based on specific DCI 708, i.e., a dynamic grant, overlaps in terms of at least some time and frequency, a terminal needs to determine a resource required to be prioritized. First, priority of PDSCH or PUSCH scheduled based on the specific DCI 708, i.e., a dynamic grant, may be determined according to the DCI. A method for determining priority is described as shown in FIGS. 4, 5A, 5B, 6A, and 6B. In the case of the configured grant capable of PDSCH reception or PUSCH transmission without DCI, it may be possible to determine priority of data that can be transmitted or received via the configured grant resource by the following two methods.

Method 1: The priority of data by the configured grant may be determined via a higher signal. Specifically, in the case of Rel-15 NR, a configured grant resource (type 1 configured grant), which can be configured and activated only based on a higher signal, is present, and in this case, a priority configuration by a higher layer signal may be applied. For example, when the base station configures a configured grant resource via the higher signal, information including data priority information for data transmission or data reception via the configured grant resource may be further included in the higher signal, so as to be transmitted to the terminal After receiving priority information configured for each specific configured grant resource, the terminal may be able to transmit or receive data in a corresponding configured grant resource only for data satisfying the corresponding priority (i.e., data having the same priority as that of the configured grant resource configured via the higher signal, or data having a priority that is the same as or higher than that of the configured grant resource configured via the higher signal).

Method 2: Priority information may be included in DCI for activation of a configured grant. Specifically, in the case of Rel-15 NR, the base station transmits basic configured grant configuration information to the terminal via an upper signal, and the terminal should receive DCI including additional activation information in order to transmit or receive actual data. This is referred to as a type 2 configured grant. If priority-related information is included in the DCI information, the terminal may determine the priority of the data by the configured grant activated via the priority information.

As shown in Table 5, the type 2 configured grant may be activated by DCI format 0_0 or DCI format 0_1. Specifically, in the case of the type 2 configured grant, in DCI format 0_1, which is non-fallback DCI, priority information of the type 2 configured grant is indicated by a priority field included in DCI, and since DCI format 0_0, which is fallback DCI, has no separate priority field, the priority can be determined by at least one of the methods described in FIGS. 5A and 5B.

TABLE 5

|  | DCI format 0_0 | DCI format 0_1 |
|---|---|---|
| HARQ process number | set to all '0's | set to all '0's |
| Redundancy version | set to '00' | set to '00' |
| Priority | N/A (default priority) | XXX |

The priority of the PDSCH received via the configured grant or the priority of the PUSCH transmitted via the configured grant may be determined according to the methods described above. Accordingly, if the PDSCH (or PUSCH) 710 scheduled based on a dynamic grant 708 overlaps with the PDSCHs 700, 702, 704, and 706 that are received (or PUSCHs that are transmitted) according to the configured grant 706 (e.g., in the case of 704 and 706), the terminal may compare respective priorities so as to be able to receive only a PDSCH having a higher priority (or to transmit only a PUSCH having a higher priority). For example, the terminal does not receive (or transmit) a PDSCH (or PUSCH) having a low priority. Here, a case of receiving the PDSCH represents transmission of ACK or NACK information via an HARQ-ACK resource corresponding thereto. Further, reception of no PDSCH may represent that, if HARQ-ACK information corresponding to the PDSCH is indicated as NACK, or if only the HARQ-ACK resource for the PDSCH exists, the HARQ-ACK information itself may not be transmitted.

The specifically described situation may be applied to a case where the terminal is unable to concurrently receive two or more PDSCHs (or transmit PUSCHs). If the terminal is able to receive two or more PDSCHs (or transmit PUSCHs), it may be possible to receive (or transmit) PDSCHs (or PUSCHs), which can be concurrently processed, for each priority. For example, in a case where the terminal is able to concurrently receive two PDSCHs, if a total of three PDSCH resource regions, which include two PDSCH resource regions scheduled via a dynamic grant and one PDSCH resource region configured via the configured grant, overlap each other on at least one symbol, it may be possible that the terminal receives two PDSCHs having a high priority, and does not receive one PDSCH having a lowest priority. Therefore, the terminal receives two PDSCHs of high priority and reports, to the base station, whether HARQ-ACK information therefor is ACK or NACK. Further, it may be possible that the terminal does not receive one PDSCH having the lowest priority, and indicates, as NACK, HARQ-ACK information corresponding to the PDSCH and transmits the same to the base station, or that the terminal does not perform HARQ-ACK transmission itself.

The terminal may perform retransmission for the PUSCH transmitted via the configured grant, which is possible by the base station transmitting, to the terminal, DCI including a CRC scrambled with the configured scheduling RNTI (CS-RNTI). If the configured grant includes priority information, the base station may transmit a retransmission request for the PUSCH to the terminal based on the DCI including the CRC scrambled with CS-RNTI, wherein it may be possible that the DCI includes or does not include the priority information. In this case, there may be a problem regarding whether a priority value of the DCI for scheduling of data retransmission should be equal to the priority of the configured grant. In order to address this issue, retransmission scheduling for the configured grant including priority information may be possible by the following methods.

Method 1: Retransmission scheduling may be possible based on all DCI regardless of a priority value associated with a configured grant.

According to method 1, the terminal can expect to be scheduled for retransmission based on DCI having a value of priority (or priority information), which is the same as or different from a priority value associated with the configured grant. For example, if the priority value associated with the configured grant is 1, the DCI for scheduling of retransmission for the configured grant may be able to have a priority value of 1 or a priority value other than 1. DCI for scheduling of the retransmission is determined by an HARQ process value corresponding to the configured grant and a value for NDI to indicate the retransmission for the configured grant. In a case of fallback DCI, in which, according to the method, a priority information field is not included in DCI, but the priority is configured via a higher signal, the fallback DCI including the CRC scrambled with CS-RNTI regardless of the preconfigured priority information value may schedule retransmission for the configured grant corresponding to all priority values.

Method 2: Retransmission scheduling may be possible based on only DCI corresponding to a priority value associated with a configured grant.

According to method 2, the terminal can expect to be scheduled for retransmission based on DCI having a value of priority (or priority information), which is the same as a priority value associated with the configured grant. For example, if the priority value associated with the configured grant is 1, the DCI for scheduling of retransmission for the configured grant is required to have a priority value of 1. In a case of fallback DCI, in which a priority information field is not included in the DCI but a priority is configured via a higher signal, the base station may schedule only retransmission for the configured grant corresponding to a preconfigured priority information value based on the fallback DCI.

Figure 7B:
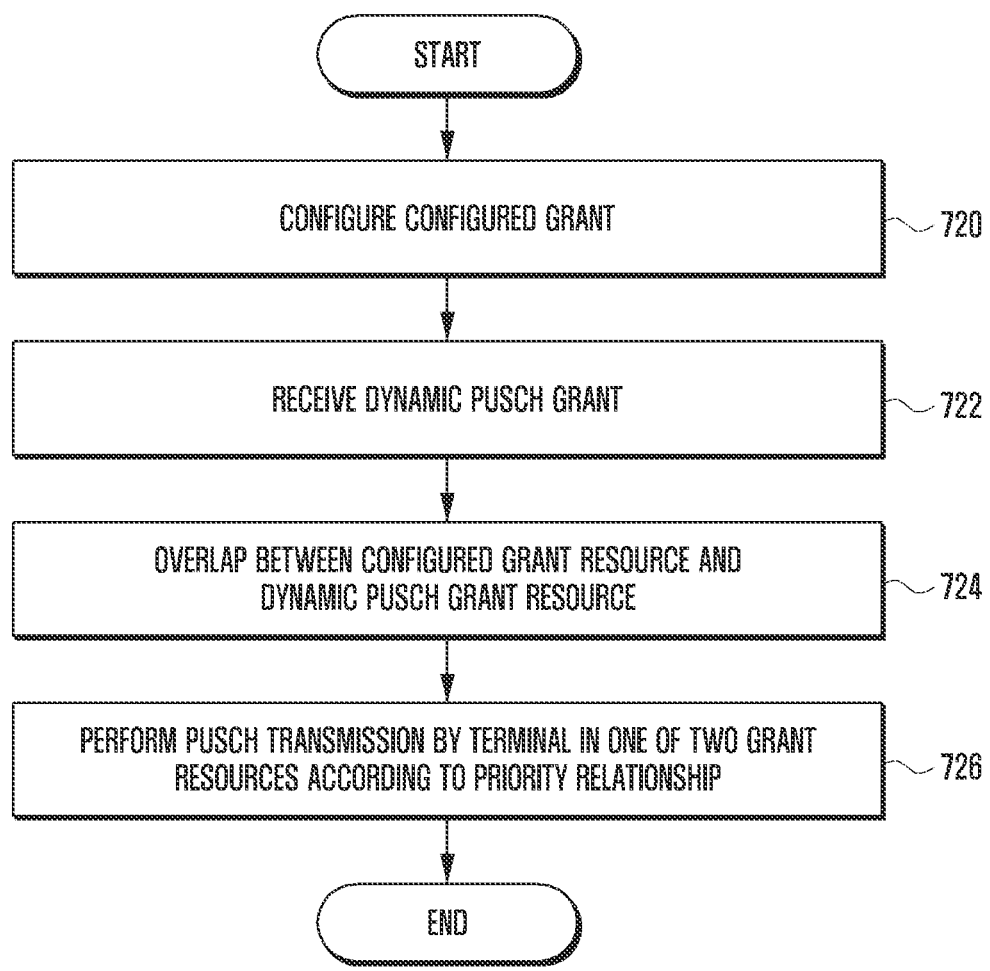
FIG. 7B is a diagram illustrating an operation of a terminal in a case where an overlap (or collision) occurs between a configured grant resource and a dynamic grant resource according to an embodiment of the disclosure.

FIG. 7B is a diagram illustrating an operation of a terminal in a case where an overlap (or collision) occurs between a configured grant resource and a dynamic grant resource according to an embodiment of the disclosure.

Referring to FIG. 7B, in operation 720, a terminal receives configuration of a configured grant by a higher signal from a base station. In a case of a type 2 configured grant or semi-persistent scheduling (SPS), the terminal further receives L1 information (i.e., DCI for activation of configured scheduling). Then, the terminal performs transmission via a configured grant resource if uplink data is generated, and in the case of SPS, the terminal periodically receives downlink data. When the base station transmits the dynamic grant via signal L1, and the terminal receives information in operation 722 thereof, the terminal confirms that a resource indicated by a corresponding dynamic grant overlaps in operation 724 with at least a part of the preconfigured configured grant or SPS resource.

If the terminal supports only one PUSCH transmission or one (for unicast) PDSCH reception, there may occur a problem that one of two should be selected for transmission/reception. On the contrary, if the terminal supports two or more PUSCH transmissions or two or more PDSCH receptions, all of the transmission and reception may be performed without selecting data to be transmitted or received. However, if more PUSCH resources are configured and scheduled by the configured grant and the dynamic grant than the number of PUSCHs capable of simultaneous multiple transmissions that can be supported by the terminal, the above-described selection problem may occur. Similarly, if more PDSCH resources are configured and scheduled by the SPS and the dynamic grant than the number of PUSCHs capable of simultaneous multiple transmissions that can be supported by the terminal, the above-described selection problem may occur.

According to the priority information value described in FIG. 7B, the terminal transmits in operation 726 data via the PUSCH resource configured with the configured grant or the PUSCH resource scheduled with the dynamic grant. If priority information between the PUSCHs configured via the configured grant and the dynamic grant is the same, the terminal transmits uplink data via the PUSCH scheduled with the dynamic grant. In other words, the PUSCH by the configured grant or the dynamic grant with low priority information cancels (or drops) transmission.

In a case where the PUCCH resource which is previously configured to the terminal via a higher signal or scheduled to the terminal via signal L1 (DCI) overlaps, in at least one OFDM symbol, with a PUSCH configured via the configured grant and a PUSCH resource scheduled via the dynamic grant, if the PDSCH associated with the PUCCH has the same priority information value as that of the PUSCH, uplink control information (UCI) may be piggybacked on the PUSCH and transmitted. Alternatively, if the terminal has a capability of performing transmission of only one PUCCH or PUSCH, the terminal may transmit only a PUCCH or PUSCH having a high priority, and may drop a PUCCH or PUSCH having a low priority.

For example, if a PUCCH resource, in which HARQ-ACK information for PDSCH having a priority information value 1 is to be transmitted, and a PUSCH resource, which is previously configured via a configured grant having a priority information value of 2 (or scheduled via a dynamic grant) based on a higher signal or signal L1, overlap in at least one OFDM symbol, in the case of the configured grant, the terminal drops the HARQ-ACK information and transmits PUSCH if there exists data to be transmitted via the configured grant. As another example, if a PUCCH resource, in which HARQ-ACK information for PDSCH having a priority information value 1 is to be transmitted, and a PUSCH resource, which is previously configured via a configured grant having a priority information value of 1 (or scheduled via a dynamic grant) based on a higher signal or signal L1, overlap in at least one OFDM symbol, in the case of the configured grant, the terminal piggybacks the HARQ-ACK information to the PUSCH so as to transmit the same if there exists data to be transmitted via the configured grant. For reference, the examples are applied when it is assumed that a higher the priority value results in a higher the priority, and the reverse is also possible.

Likewise, according to the priority information values described in FIG. 7B, the terminal receives 726 data in a descending order of priority information via the PDSCH resource configured based on the SPS or the PDSCH resource scheduled based on the dynamic grant. If priority information between the PDSCHs configured via the SPS and the dynamic grant is the same, the terminal receives downlink data via the PDSCH scheduled based on the dynamic grant. In other words, for the PDSCH with low priority information according to the SPS or dynamic grant, the terminal cancels (or drops) PDSCH reception. For example, in a situation where three unicast PDSCHs can be concurrently received, the terminal is scheduled with respective PDSCHs via one SPS having a priority value of 2 and dynamic grants having priority values of 1, 2, or 3, and if four PDSCH resources overlap in at least one OFDM symbol, the terminal drops the PDSCH scheduled via the dynamic grant having a lowest priority value of 1.

FIG. 7B illustrates PUSCH transmission, but this may also be applied to PDSCH reception, as described above.

Figure 8:
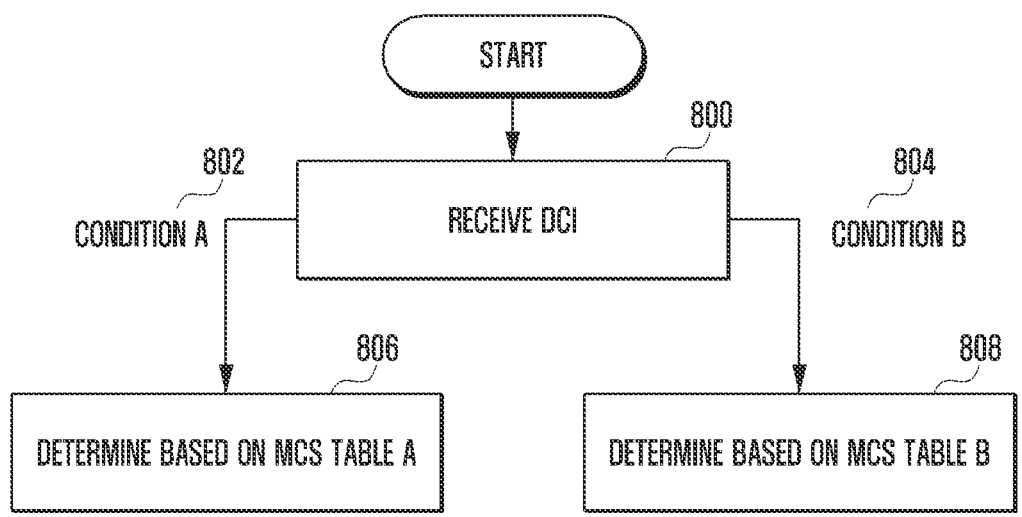
FIG. 8 is a diagram illustrating a method of dynamically selecting a modulation coding scheme (MCS) table information according to DCI including priority information according to an embodiment of the disclosure.

FIG. 8 is a diagram illustrating a method of dynamically selecting MCS table information according to DCI including priority information according to an embodiment of the disclosure.

Referring to FIG. 8, an MCS table is a table describing a modulation order, a target code rate, and spectral efficiency according to an MCS index indicated by DCI as shown in Table 6 below. Table 6 below is an example of an MCS table for PDSCH, and there may be a plurality of MCS tables. If a different MCS table is used, even if the same MCS index is indicated, the indicated modulation order, target code rate, and spectral efficiency may vary.

TABLE 6

| MCS Index $I_{MCS}$ | Modulation Order $Q_m$ | Target code Rate Rx [1024] | Spectral efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

There are two ways to select the MCS table in Rel-15 NR. A first method is to configure the MCS table for use, via a higher signal, and the other is to select the MCS table based on RNTI which scrambles CRC of DCI. If the MCS table is associated with a specific service, the terminal may be able to determine a specific MCS table to be used, based on priority information in a DCI field.

Specifically, when the base station configures priority information of a DCI field in advance, it is possible to configure, via the higher layer, an MCS table which is implicitly associated with each piece of priority information. For example, if the priority information with a total of 2 bits is included in the DCI, the base station may perform configuration via the higher signal, wherein priority information of "00" and "01" is associated with MCS table A, "10" is associated with MCS table B, and "11" is associated with MCS table C. In this case, the terminal may determine the MCS table to be used, according to the value indicated by the priority information in the DCI field via DCI decoding, and additionally, the terminal may be able to implicitly determine that an MCS index value of the DCI field is indicated based on the corresponding MCS table.

Referring to FIG. 8, the terminal receives 800 DCI and determines which condition of A and B is satisfied. If DCI transmitted by the base station satisfies 802 condition A (i.e., a case where one of sets of priority values associated with MCS table A is included in corresponding DCI priority information), the terminal determines 806 that the MCS index is configured based on MCS table A. If condition B (i.e., a case where one of sets of priority values associated with MCS table B is included in corresponding DCI priority information) is satisfied 804, the terminal determines 808 that the MCS index is configured based on MCS table B.

Figure 9:
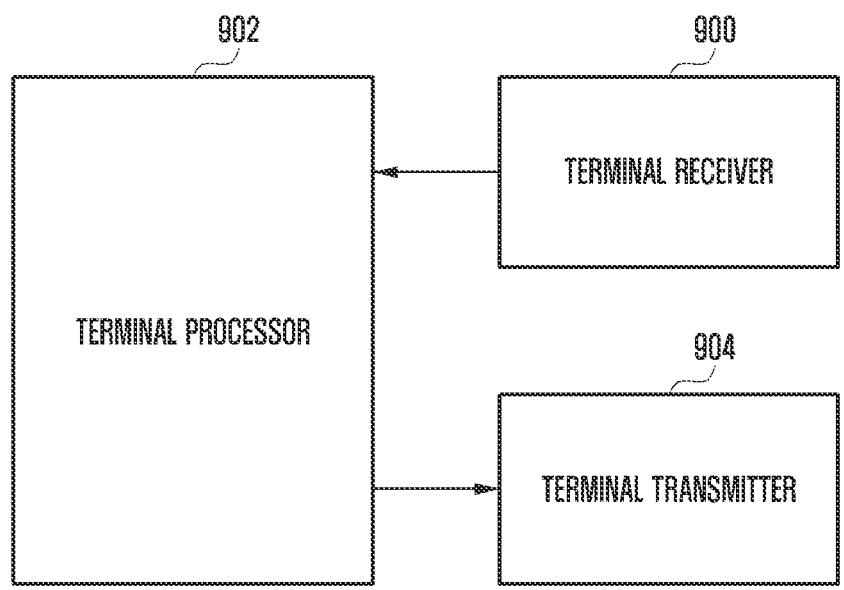
FIG. 9 is a block diagram illustrating a structure of a terminal capable of performing according to an embodiment of the disclosure.

FIG. 9 is a block diagram illustrating a structure of a terminal capable of performing according to an embodiment of the disclosure.

Referring to FIG. 9, a terminal of the disclosure may include a terminal receiver 900, a terminal transmitter 904, and a terminal processor 902. The terminal receiver 900 and the terminal transmitter 904 may collectively be referred to as a transceiver. The transceiver may transmit a signal to or receive a signal from the base station. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a wireless channel, may output the signal to the terminal processor 902, and may transmit the signal output from the terminal processor 902, via the wireless channel The terminal processor 902 may control a series of procedures so that the terminal may operate according to the above-described embodiments.

Figure 10:
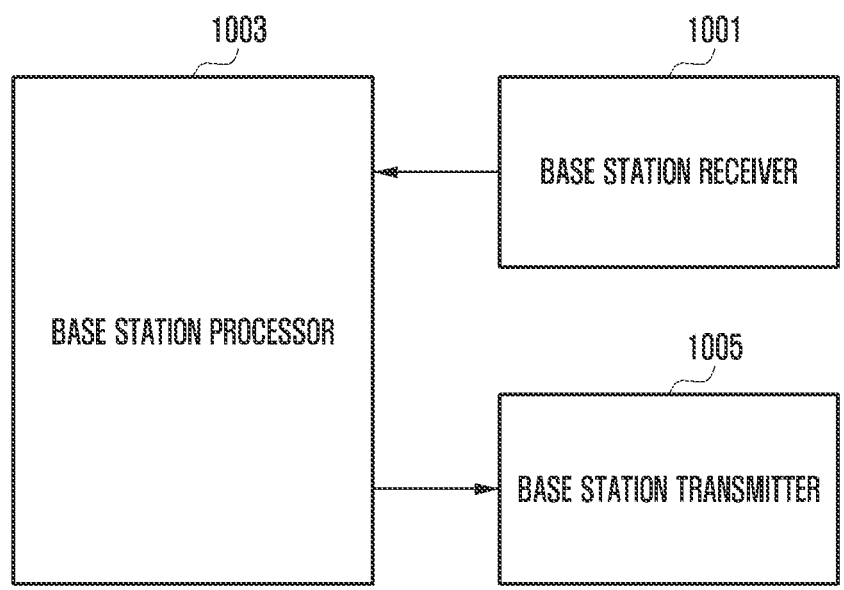
FIG. 10 is a block diagram illustrating a structure of a base station capable of performing according to an embodiment of the disclosure.

FIG. 10 is a block diagram illustrating a structure of a base station capable of performing according to an embodiment of the disclosure.

Referring to FIG. 10, in an embodiment of the disclosure, a base station may include at least one of a base station receiver 1001, a base station transmitter 1005, and a base station processor 1003. The terminal receiver 1001 and the terminal transmitter 1005 may collectively be referred to as a transceiver. The transceiver may transmit a signal to or receive a signal from the terminal. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a wireless channel, may output the signal to the base station processor 1003, and may transmit the signal output from the base station processor 1003 via the wireless channel The base station processor 1003 may control a series of procedures so that the base station operates according to the above-described embodiment of the disclosure.

The embodiments of the disclosure described and shown in the specification and the drawings have been presented to easily explain the technical contents of the disclosure and help understanding of the disclosure, and are not intended to limit the scope of the disclosure. For example, it will be apparent to those skilled in the art that other modifications and changes may be made thereto based on the technical spirit of the disclosure. Further, the above respective embodiments may be employed in combination, as necessary. For example, the embodiments of the disclosure may be partially combined to operate a base station and a terminal. Further, although the above embodiments have been described by way of the NR system, other variants based on the technical idea of the embodiments may be implemented in other systems, such as FDD or TDD LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal of a communication system, the method comprising:
   receiving, from a base station, cancellation priority information configuring that a cancellation of a physical uplink shared channel (PUSCH) transmission is applied to a PUSCH of a specific priority;
   receiving, from the base station, downlink control information (DCI) for the cancellation of the PUSCH transmission, wherein the DCI includes resource information indicating time and frequency resources for the cancellation;
   identifying whether the cancellation is applied to the PUSCH transmission or not based on a priority associated with a PUSCH; and
   performing the cancellation of the PUSCH transmission, in case that a resource of the PUSCH is overlapped with the time and frequency resources indicated by the resource information and the priority associated with the PUSCH corresponds to the specific priority.

2. The method of claim 1, further comprising:
   performing the transmission of the PUSCH to the base station, in case that the priority associated with the PUSCH corresponds to other priority than the specific priority.

3. The method of claim 1, further comprising:
   receiving, from the base station, DCI for scheduling the PUSCH,
   wherein the DCI for scheduling the PUSCH includes the priority associated with the PUSCH and resource allocation information indicating the resource of the PUSCH.

4. The method of claim 1, wherein the PUSCH transmission is cancelled from an earliest overlapping resource between the resource of the PUSCH and the time and frequency resource indicated by the resource information in a time domain.

5. The method of claim 1, wherein the resource information indicates the time and frequency resources by a unit of symbols and a unit of a frequency domain partition.

6. A method performed by a base station of a communication system, the method comprising:
   receiving, from a terminal, cancellation priority information configuring that a cancellation of a physical uplink shared channel (PUSCH) transmission is applied to the PUSCH of a specific priority;
   transmitting, to the terminal, downlink control information (DCI) for the cancellation of the PUSCH transmission, wherein the DCI includes resource information indicating time and frequency resources for the cancellation; and
   identifying that a reception of the PUSCH is cancelled, in case that a resource of the PUSCH is overlapped with the time and frequency resources indicated by the resource information and a priority associated with the PUSCH corresponds to the specific priority.

7. The method of claim 6, further comprising:
   receiving, from the terminal, the PUSCH in case that the priority associated with the PUSCH corresponds to other priority than the specific priority.

8. The method of claim 6, further comprising:
   transmitting, to the terminal, DCI for scheduling the PUSCH,
   wherein the DCI for scheduling the PUSCH includes the priority associated with the PUSCH and resource allocation information indicating the resource of the PUSCH.

9. The method of claim 6, wherein the PUSCH transmission is cancelled from an earliest overlapping resource between the resource of the PUSCH and the time and frequency resource indicated by the resource information in a time domain.

10. The method of claim 6, wherein the resource information indicates the time and frequency resources by a unit of symbols and a unit of a frequency domain partition.

11. A terminal of a communication system, the terminal comprising:
    a transceiver; and
    a controller coupled with the transceiver and configured to:
       receive, from a base station, cancellation priority information configuring that a cancellation of a physical uplink shared channel (PUSCH) transmission is applied to a PUSCH of a specific priority,
       receive, from the base station, downlink control information (DCI) for the cancellation of the PUSCH transmission, wherein the DCI includes resource information indicating time and frequency resources for the cancellation,
       identify whether the cancellation is applied to the PUSCH transmission or not based on a priority associated with a PUSCH, and
       perform the cancellation of the PUSCH transmission, in case that a resource of the PUSCH is overlapped with the time and frequency resources indicated by the resource information and the priority associated with the PUSCH corresponds to the specific priority.

12. The terminal of claim 11, wherein the controller is further configured to perform the transmission of the PUSCH to the base station, in case that the priority associated with the PUSCH corresponds to other priority than the specific priority.

13. The terminal of claim 11,
    wherein the controller is further configured to receive, from the base station, DCI for scheduling the PUSCH, and
    wherein the DCI for scheduling the PUSCH includes the priority associated with the PUSCH and resource allocation information indicating the resource of the PUSCH.

14. The terminal of claim 11, wherein the PUSCH transmission is cancelled from an earliest overlapping resource between the resource of the PUSCH and the time and frequency resource indicated by the resource information in a time domain.

15. The terminal of claim 11, wherein the resource information indicates the time and frequency resources by a unit of symbols and a unit of a frequency domain partition.

16. A base station of a communication system, the base station comprising:
    a transceiver; and
    a controller coupled with the transceiver and configured to:
       receive, from a terminal, cancellation priority information configuring that a cancellation of a physical uplink shared channel (PUSCH) transmission is applied to the PUSCH of a specific priority,
       transmit, to the terminal, downlink control information (DCI) for the cancellation of the PUSCH transmission, wherein the DCI includes resource information indicating time and frequency resources for the cancellation, and
       identify that a reception of the PUSCH is cancelled, in case that a resource of the PUSCH is overlapped with the time and frequency resources indicated by the resource information and a priority associated with the PUSCH corresponds to the specific priority.

17. The base station of claim 16, the controller is further configured to receive, from the terminal, the PUSCH in case that the priority associated with the PUSCH corresponds to other priority than the specific priority.

18. The base station of claim 16,
wherein the controller is further configured to transmit, to the terminal, DCI for scheduling the PUSCH, and
wherein the DCI for scheduling the PUSCH includes the priority associated with the PUSCH and resource allocation information indicating the resource of the PUSCH.

19. The base station of claim 16, wherein the PUSCH transmission is cancelled from an earliest overlapping resource between the resource of the PUSCH and the time and frequency resource indicated by the resource information in a time domain.

20. The base station of claim 16, wherein the resource information indicates the time and frequency resources by a unit of symbols and a unit of a frequency domain partition.

* * * * *